(12) United States Patent
Son et al.

(10) Patent No.: US 9,313,373 B2
(45) Date of Patent: Apr. 12, 2016

(54) DISPLAY APPARATUS AND SIGNAL PROCESSING MODULE FOR RECEIVING BROADCASTING AND DEVICE AND METHOD FOR RECEIVING BROADCASTING

(71) Applicant: SAMSUNG ELECTRONICS CO., LTD., Suwon-si (KR)

(72) Inventors: Tae-yong Son, Yongin-si (KR);
Ho-woong Kang, Yongin-si (KR);
Hak-jae Kim, Yongin-si (KR);
Woo-jung Kim, Suwon-si (KR);
Jae-hyo Lim, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 544 days.

(21) Appl. No.: 13/710,743

(22) Filed: Dec. 11, 2012

(65) Prior Publication Data

US 2013/0162908 A1   Jun. 27, 2013

(30) Foreign Application Priority Data

Dec. 27, 2011   (KR) .................. 10-2011-0143367
Dec. 27, 2011   (KR) .................. 10-2011-0143621
Dec. 30, 2011   (KR) .................. 10-2011-0147218
Dec. 30, 2011   (KR) .................. 10-2011-0147294
Jul. 3, 2012    (KR) .................. 10-2012-0072183

(51) Int. Cl.
*H04N 5/14*   (2006.01)

(52) U.S. Cl.
CPC ............. *H04N 5/14* (2013.01); *G09G 2340/10* (2013.01); *G09G 2340/125* (2013.01);

(Continued)

(58) Field of Classification Search
CPC .................. G09G 2340/10; G09G 2340/125; G09G 2360/06; G09G 2360/08; G09G 2360/10; G09G 2370/027; G09G 2370/12; H04N 5/14
USPC ................................................. 348/836, 571
See application file for complete search history.

(56) References Cited

U.S. PATENT DOCUMENTS 7,197,760 B1   3/2007   Graef
7,508,452 B2   3/2009   Mori et al.

(Continued)

FOREIGN PATENT DOCUMENTS

CN   1905649 A    1/2007
CN   202059495 U   11/2011

(Continued)

OTHER PUBLICATIONS

International Search Report, dated Mar. 26, 2013, issued by the International Searching Authority in counterpart International Application No. PCT/KR2012/009970.

(Continued)

*Primary Examiner* — Thai Tran
*Assistant Examiner* — Stephen Smith
(74) *Attorney, Agent, or Firm* — Sughrue Mion, PLLC

(57) ABSTRACT

A display apparatus for receiving broadcasting includes a display unit configured to display an image thereon, a cover which partially covers the display unit, at least one signal connector which is configured to connect to a portable signal processing module that is located outside the cover and processes a signal to be displayed by the display unit, and receives the signal processed by the signal processing module, and a timing controller (T-con) configured to control a display timing of the signal received by the at least one signal connector.

24 Claims, 23 Drawing Sheets

(52) U.S. Cl.
CPC ....... *G09G 2360/06* (2013.01); *G09G 2360/08* (2013.01); *G09G 2360/10* (2013.01); *G09G 2370/027* (2013.01); *G09G 2370/12* (2013.01)

(56) References Cited

U.S. PATENT DOCUMENTS

| | | | | |
|---|---|---|---|---|
| 7,788,412 | B2* | 8/2010 | Guo | G06F 3/14 710/1 |
| 7,839,896 | B2* | 11/2010 | Ishimura | H04N 5/775 348/14.12 |
| 8,102,475 | B2* | 1/2012 | Chang | H04N 5/64 348/552 |
| 8,793,407 | B2* | 7/2014 | Jeon | G09G 5/006 345/205 |
| 2002/0135584 | A1* | 9/2002 | Lee | G06F 3/1423 345/531 |
| 2003/0233667 | A1 | 12/2003 | Umipig | |
| 2004/0165119 | A1* | 8/2004 | Choi | H04N 5/44 348/839 |
| 2004/0252562 | A1 | 12/2004 | Kim | |
| 2005/0219427 | A1* | 10/2005 | Akazawa | H04N 21/43637 348/839 |
| 2006/0143353 | A1 | 6/2006 | Son | |
| 2007/0024761 | A1 | 2/2007 | Chang | |
| 2007/0046838 | A1 | 3/2007 | Tsai | |
| 2007/0153134 | A1* | 7/2007 | Sieben | H04N 21/43632 348/725 |
| 2007/0252920 | A1* | 11/2007 | Chen | H04N 5/63 348/839 |
| 2008/0252782 | A1* | 10/2008 | Komeno | G09G 5/12 348/512 |
| 2008/0300815 | A1* | 12/2008 | Kim | G09G 5/006 702/108 |
| 2009/0064265 | A1 | 3/2009 | Takeda et al. | |
| 2009/0115252 | A1* | 5/2009 | Caraghiorghiopol | H02J 1/10 307/48 |
| 2009/0128452 | A1 | 5/2009 | Bril et al. | |
| 2009/0158377 | A1* | 6/2009 | Diab | G06F 1/266 725/117 |
| 2009/0174826 | A1* | 7/2009 | Ford | G06Q 99/00 348/839 |
| 2009/0251603 | A1* | 10/2009 | Burkhardt | G06F 11/1433 348/552 |
| 2009/0262264 | A1* | 10/2009 | Yu | G06F 1/1601 348/836 |
| 2010/0058427 | A1* | 3/2010 | Ansari | H04N 21/41407 725/131 |
| 2010/0118000 | A1* | 5/2010 | Gu | G06F 1/1601 345/204 |
| 2010/0250988 | A1* | 9/2010 | Okuda | G09G 5/006 713/323 |
| 2011/0062792 | A1* | 3/2011 | Okazaki | H02J 9/005 307/116 |
| 2011/0103472 | A1* | 5/2011 | Lefebvre | H04N 21/4122 375/240.12 |
| 2011/0157310 | A1* | 6/2011 | Mitani | H04N 5/775 348/43 |
| 2011/0185204 | A1* | 7/2011 | Louboutin | G06F 1/263 713/320 |
| 2011/0187203 | A1* | 8/2011 | Ohno | H02J 1/00 307/126 |
| 2011/0242430 | A1* | 10/2011 | Qi | H04N 21/4104 348/730 |
| 2011/0260556 | A1* | 10/2011 | Partridge | F41H 1/02 307/150 |
| 2012/0105603 | A1* | 5/2012 | Liu | H04N 13/026 348/51 |
| 2012/0113113 | A1* | 5/2012 | Hong | H04N 13/0059 345/419 |

FOREIGN PATENT DOCUMENTS

| | | |
|---|---|---|
| JP | 2000-242238 A | 9/2000 |
| JP | 2000-253425 A | 9/2000 |
| JP | 2008-141725 A | 6/2008 |
| JP | 2009-044706 A | 2/2009 |
| JP | 2009157131 A | 7/2009 |
| JP | 2010-139527 A | 6/2010 |
| KR | 1020050078866 A | 8/2005 |
| KR | 10-2007-0013401 A | 1/2007 |
| KR | 1020090095910 A | 9/2009 |
| KR | 10-2010-0031846 A | 3/2010 |
| KR | 10-2010-0052396 A | 5/2010 |

OTHER PUBLICATIONS

Communication, dated Jun. 11, 2013, issued by the European Patent Office in counterpart European Application No. 12193919.3.
Anonymous: "Turn Your TV into a Smart TV", Dec. 7, 2010, p. 1, XP054975134, Retrieved from the Internet: URL: http//www.youtube.com/watch?v=fdQd7Cxsp10.
Communication dated Aug. 5, 2013 from the Korean Intellectual Property Office in a counterpart application No. 10-2012-0072183.
Communication dated Dec. 17, 2013 issued by the Japanese Patent Office in counterpart Japanese Application No. 2012-278438.
Communication dated Feb. 20, 2014 issued by the Korean Intellectual Property Office in counterpart Korean Application No. 10-2012-0072183.
Communication dated Nov. 11, 2014, issued by the Japanese Patent Office in counterpart Japanese Application No. 2012-278438.
Communication dated Jul. 3, 2015, issued by the State Intellectual Property Office of P.R. China in counterpart Chinese Application No. 201210580168.5.
Communication dated Aug. 28, 2015, issued by the Japanese Patent Office in counterpart Japanese Application No. 2012-278438.

* cited by examiner

FIG. 5
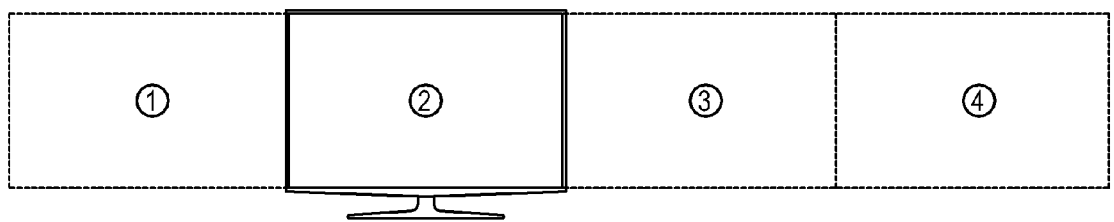
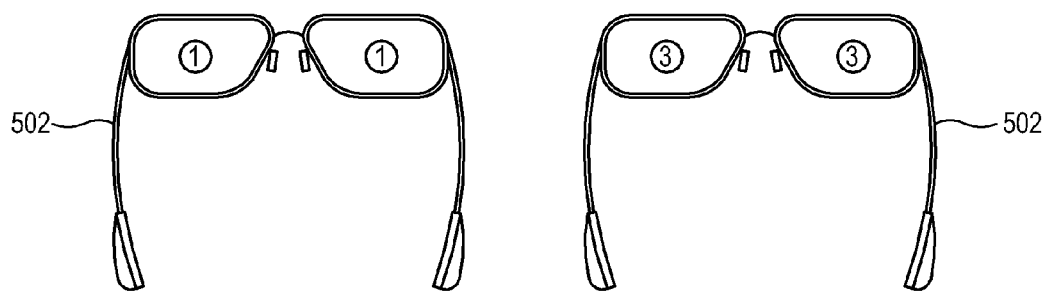

DISPLAY APPARATUS AND SIGNAL PROCESSING MODULE FOR RECEIVING BROADCASTING AND DEVICE AND METHOD FOR RECEIVING BROADCASTING

CROSS-REFERENCE TO RELATED APPLICATIONS

This application claims priority from Korean Patent Application No. 10-2012-0072183 filed on Jul. 3, 2012, Korean Patent Application No. 10-2011-0147218 filed on Dec. 30, 2011, Korean Patent Application No. 10-2011-0147294 filed on Dec. 30, 2011, Korean Patent Application No. 10-2011-0143621 filed on Dec. 27, 2011 and Korean Patent Application No. 10-2011-0143367 filed on Dec. 27, 2011, the disclosures of which are incorporated herein in their entirety by reference.

BACKGROUND

1. Field

Apparatuses and methods consistent with exemplary embodiments relate to a device and a method for receiving broadcasting, and more particularly, to a display apparatus and a signal processing module for receiving broadcasting and a device and a method for receiving broadcasting incorporating the same in which a display apparatus including a video or audio output device and a signal processing module which processes a signal displayed by the display apparatus are separately provided and detachably connected to each other through a single cable to ensure smooth after-service repairs or upgrading.

2. Description of the Related Art

A configuration of a digital television (TV) or a display apparatus including a digital broadcasting receiver therein may be largely divided into a signal processor which processes an image signal and an audio signal, a panel which includes a screen, a speaker which outputs audio and a power supply which supplies power.

For example, a display apparatus implemented as a flat display panel, such as a liquid crystal display (LCD) panel, includes a signal processor, a power supply, and a speaker, which are provided behind a panel, a connector connecting elements, a cable and a cover (including a chassis) covering the elements other than a front panel.

After design, shipment and delivery to consumers, conventional display apparatuses cannot easily be upgraded with new functions to meet a new broadcasting standard, to play video compressed in a new format, or to enable the conventional display apparatuses to have a new function (such as a web browser).

The related art display apparatus may have a signal processor, which processes a signal, replaced with a new signal processor having upgraded functions and performance. To replace the signal processor, a user typically detaches and re-attaches a cover, and may be exposed to high-voltage power, facing a high risk.

The related art display apparatus is not easy to repair in case of a malfunction due to its large size, and is further not easy to upgrade, and can be repaired only by after-service personnel of the manufacturer. As a result, the repair expenses increase sharply as a result of the after-service personnel visiting a user's house and repairing the user's conventional display apparatus.

SUMMARY

One or more exemplary embodiments provide a display apparatus and a signal processing module for receiving broadcasting and a device and a method for receiving broadcasting which ensure easy after-service repairs or upgrading at low cost.

One or more exemplary embodiments also provide a display apparatus and a signal processing module for receiving broadcasting and a device and a method for receiving broadcasting which enable a user to perform after-service repairs on, or upgrading of, the display apparatus on his/her own.

One or more exemplary embodiments also provide a display apparatus and a signal processing module for receiving broadcasting and a device and method employing a device for receiving broadcasting which are slim.

One or more exemplary embodiments also provide a display apparatus and a signal processing module for receiving broadcasting and a device and a method employing a device for receiving broadcasting which are easily transportable or movable.

One or more exemplary embodiments also provide a display apparatus and a signal processing module for receiving broadcasting and a device and a method employing a device for receiving broadcasting which are simple in design as power and signals are exchanged by a single cable between the display apparatus and the signal processing module.

One or more exemplary embodiments also provide a display apparatus and a signal processing module for receiving broadcasting and a device and a method employing a device for receiving broadcasting in which the signal processing module processes a data signal of a plurality of contents and transmits the processed data signal to the display apparatus to output the data signal in a multi-view display.

One or more exemplary embodiments also provide a display apparatus and a signal processing module for receiving broadcasting and a device and a method employing a device for receiving broadcasting in which the display apparatus and the signal processing module include at least one tuner, respectively.

According to aspect of an exemplary embodiment, there is provided a display apparatus for receiving broadcasting including: a display unit configured to display an image thereon; a cover which partially covers the display unit; at least one signal connector which is configured to connect to a portable signal processing module that is located outside the cover and processes a signal to be displayed by the display unit, and receives the signal processed by the signal processing module; and a timing controller (T-con) configured to control a display timing of the signal received by the at least one signal connector.

The display apparatus may include a first power connector which is configured to receive power to be used by the display apparatus from the portable signal processing module.

The display apparatus may include at least one second power connector which is configured to supply power to the portable signal processing module.

The at least one signal connector may include a single cable and may be configured to connect to either the display apparatus or the portable signal processing module.

The at least one signal connector and the first power connector may each include a single cable, and may be configured to connect to either the display apparatus or the portable signal processing module.

The at least one signal connector and the second power connector may each include a single cable, and may be configured to connect to either the display apparatus or the portable signal processing module.

The at least one signal connector may include at least one of a universal serial bus (USB) terminal, a high definition multimedia interface (HDMI) terminal, a LAN terminal, a SCART terminal, an RS232 terminal, an optical terminal, and a radio frequency (RF) transmitter.

The at least one signal connector and the first power connector may each include a USB terminal.

The at least one signal connector and the second power connector may each include a USB terminal.

The signal input by the portable signal processing module may include a data signal which is formed by compressing a plurality of contents, and the data signal may be received through a single signal connector.

A data signal of a plurality of contents may be received through a plurality of signal connectors from the portable signal processing module, and the display unit may output the plurality of contents in a multi-view format.

A data signal of a plurality of contents may be multiplexed by a multiplexer of the portable signal processing module to transmit the multiplexed signal to the at least one signal connector which may include a single signal connector, and the display unit may output the plurality of contents in a multi-view format.

The at least one signal connector may include a single signal connector connected to an encoder which encodes a plurality of content data processed by the portable signal processing module.

The single signal connector may be connected to a decoder which decodes a plurality of encoded content data.

The encoder and the decoder may be included in the single signal connector.

The display apparatus may further include at least one signal receiver.

The display apparatus may further include a first signal processor which processes a signal that is received by the at least one signal receiver, and the signal which is processed and supplied by the portable signal processing module may include a signal that has been processed by a second signal processor comprising upgraded hardware and software as compared to the first signal processor.

The signal which is received by the at least one signal receiver may be transmitted to the portable signal processing module through the at least one signal connector.

The at least one signal receiver may include a first tuner to select a first channel signal.

The at least one second channel signal selected by a second tuner of the portable signal processing module may be received, and together with the first channel signal, output as a multi-view format through the display unit.

The first tuner may share a single antenna with the second tuner of the portable signal processing module.

The first tuner may transmit a channel signal, which is supplied through an antenna, to the signal processing module in a wired and/or wireless manner.

The display apparatus may further include a storage unit.

The storage unit may store backup data of the portable signal processing module.

The display apparatus may further include a power supply which supplies power to the second power connector.

The power supply may supply different voltages to a plurality of second power connectors.

The display apparatus may further include a power controller which controls the power supply to change a power connector connected to the portable signal processing module to another power connector to meet power consumption requirements of the portable signal processing module when power consumption of the portable signal processing module exceeds a maximum output value of the connected power connector.

The power controller may compare the power consumption of the portable signal processing module and a power output of the power connector when the portable signal processing module is connected to the display apparatus for receiving broadcasting, and display a user interface (UI) for selecting a second power connector meeting the power consumption requirements of the portable signal processing module out of the plurality of second power connectors.

According to an aspect of another exemplary embodiment, there is provided a signal processing module for receiving broadcasting including: a signal processor which processes a signal output from the outside; a case which accommodates the signal processor therein; at least one signal connector which is configured to connect to a display apparatus located outside the case and exchanges a signal with the display apparatus; and a controller which controls the signal processor.

The signal processing module may further include a first power connector which is configured to transmit power to be used by the display apparatus.

The signal processing module may further include at least one second power connector which is configured to receive power from the display apparatus.

The at least one signal connector may include a single cable, and may be configured to connect to either the display apparatus or the signal processing module.

The at least one signal connector and the first power connector may each include a single cable, and may be configured to connect to either the display apparatus or the signal processing module.

The signal connector and the at least one second power connector may each include a single cable, and may be configured to connect to either the display apparatus or the signal processing module.

The at least one signal connector may include at least one of a universal serial bus (USB) terminal, a high definition multimedia interface (HDMI) terminal, a LAN terminal, a SCART terminal, an RS232 terminal, an optical terminal, and a radio frequency (RF) transmitter.

The at least one signal connector and the first power connector may each include a USB terminal.

The at least one signal connector and the second power connector may each include a USB terminal.

A data signal which is formed by compressing a plurality of contents may be transmitted to the display apparatus through the at least one signal connector including a single signal connector.

A plurality of contents may be transmitted to the display apparatus through a plurality of the signal connectors, respectively, and the display apparatus may output the received plurality of contents in a multi-view format.

The signal processing module may further include a multiplexer which multiplexes a plurality of contents, and the multiplexed plurality of contents may be transmitted as a multiplexed data signal to the display apparatus through the at least one signal connector which includes a single signal connector.

The at least one signal connector may include a single signal connector connected to an encoder which encodes a plurality of content data processed by the signal processor.

The single signal connector may be connected to a decoder which decodes a plurality of encoded content data.

The encoder and the decoder may be included in the single signal connector.

The signal processing module may further include at least one signal receiver.

The signal processor may receive a signal from a signal receiver of a display apparatus through the at least one signal connector, and may process the signal.

The signal processor may process a signal received by at least one signal receiver, and may transmit the processed signal to the display apparatus through the at least one signal connector.

The at least one signal receiver may include a second tuner which selects a second channel signal.

The at least one second channel signal which is selected by the second tuner may be transmitted to the display apparatus, and together with a first channel signal received by a first tuner of the display apparatus, may be output in a multi-view format.

The second tuner may share an antenna with the first tuner of the display apparatus.

The second tuner may receive a channel signal through an antenna of the first tuner of the display apparatus.

The signal processing module may further include a power supply which receives power through the second power connector and supplies power to each element of the signal processing module.

The power supply may include a regulator.

According to an aspect of another exemplary embodiment, there is provided a device for receiving broadcasting including: a display apparatus which includes a display unit configured to display an image, a cover which partially covers the display unit, a first signal connector configured to transmit a signal to and receive a signal from the outside of the cover, and a timing controller (T-con) configured to control a display timing of a signal transmitted by the first signal connector; and a signal processing module which is portable, the signal processing module including a second signal connector configured to exchange a signal with the display apparatus, a signal processor configured to process a signal input from the outside, and a controller configured to control the signal processor.

The device may further include a first power connector which is configured to supply power to the display apparatus by the signal processing module.

The device may further include at least one second power connector which is configured to supply power to the signal processing module by the display apparatus.

The first and second signal connectors each may include a single cable and may be configured to connect to either the display apparatus or the signal processing module.

The first and second signal connectors and the first power connector may each include a single cable, and may be configured to connect to either the display apparatus or the signal processing module.

The first and second signal connectors and the at least one second power connector may each include a single cable, and may be configured to connect to either the display apparatus or the signal processing module.

The first and second signal connectors may include at least one of a universal serial bus (USB) terminal, a high definition multimedia interface (HDMI) terminal, a LAN terminal, a SCART terminal, an RS232 terminal, an optical terminal, and a radio frequency (RF) transmitter.

The first and second signal connectors and the first power connector may each include a USB terminal.

The first and second signal connectors and the at least one second power connector may each include a USB terminal.

The signal processing module may compress a data signal of a plurality of contents processed by the signal processor and transmit the compressed data signal to the display apparatus through a pair of first and second signal connectors.

The signal processing module may transmit a data signal of a plurality of contents processed by the signal processor to the display apparatus through a pair of first and second signal connectors, and the display unit of the display apparatus may output the data signal of the plurality of contents, in a multi-view format.

The signal processing module may include a multiplexer which multiplexes a data signal of a plurality of contents, and transmits the multiplexed data signal of the plurality of contents to the display apparatus through a pair of first and second signal connectors, and the display unit of the display apparatus may output the multiplexed data signal of the plurality of contents, in a multi-view format.

The second signal connector may include a single second signal connector connected to an encoder which encodes a plurality of content data processed by the signal processor.

The single second signal connector may be connected to a decoder which decodes the encoded data signal of the plurality of contents transmitted by the signal processing module.

The encoder and the decoder may be included in a pair of first and second signal connectors.

The display apparatus may further include at least one first signal receiver.

The display apparatus may include a first signal processor which processes a signal received through the at least one first signal receiver, and the signal processor of the signal processing module may be upgraded from hardware and software of the first signal processor.

The display apparatus may transmit a signal received through the at least one first signal receiver, to the signal processing module through the first and second signal connectors.

The at least one first signal receiver may include a first tuner to select a first channel signal.

The signal processing module may include at least one second signal receiver.

The at least one second signal receiver may include a second tuner to select a second channel signal.

The signal processing module may transmit at least one second channel signal selected by the second tuner, to the display apparatus for receiving broadcasting, and the display apparatus may output the second channel signal, and a first channel signal selected by the first tuner, in a multi-view format through the display unit.

The first tuner may share a single antenna with the second tuner of the signal processing module.

The first tuner may transmit a channel signal received through an antenna, to the second tuner of the signal processing module in a wired and/or wireless manner.

The second tuner may transmit a channel signal received through an antenna, to the first tuner of the display apparatus in a wired and/or wireless manner.

The display apparatus may further include a storage unit.

The storage unit may store backup data of the signal processing module.

The display apparatus may further include a first power supply to supply power to the at least one second power connector.

The first power supply may supply different voltages to a plurality of the second power connectors.

The display apparatus may further include a power controller which controls the first power supply to change a second power connector connected to the signal processing module to another second power connector to meet power consumption requirements of the signal processing module when power consumption of the signal processing module exceeds a maximum output value of the connected second power connector.

The power controller may compare the power consumption of the signal processing module and a power output of the second power connector when the signal processing module is connected to the display apparatus, and display a user interface (UI) for selecting another second power connector meeting the power consumption requirements of the signal processing module out of the plurality of second power connectors.

The signal processing module may include a second power supply to supply power to each element.

The second power supply may include a regulator.

The second power supply may receive power through the at least one second power connector.

According to an aspect of another exemplary embodiment, there is provided a method for receiving and displaying broadcasting, the method including: processing a signal by a signal processing module which is portable and provided outside a cover of a display apparatus; transmitting the signal processed by the signal processing module to a display apparatus provided outside of a case of the signal processing module, through at least one signal connector; controlling a display timing of the signal transmitted to the display apparatus, by a timing controller of the display apparatus; and displaying the timing-controlled signal on a display unit of the display apparatus.

The method may further include supplying power to the display apparatus by the signal processing module through a first power connector.

The method may further include supplying power to the signal processing module by the display apparatus through a second power connector.

The method may further include processing a data signal of a plurality of contents by a signal processor of the signal processing module; compressing the processed data signal of the plurality of contents; and transmitting the compressed data signal to the display apparatus through a single signal connector.

The method may further include processing a data signal of a plurality of contents by a signal processor of the signal processing module; transmitting the processed data signal of the plurality of contents to the display apparatus through a plurality of signal connectors; and outputting the received data signal of the plurality of contents in a multi-view format to a display unit.

The method may further include multiplexing a data signal of a plurality of contents by a multiplexer of the signal processing module; transmitting the multiplexed data signal of the plurality of contents to the display apparatus through a single signal connector; and outputting the multiplexed data signal of the plurality of contents in a multi-view format to the display unit.

The method may further include encoding a data signal of a plurality of contents processed by a signal processor, by an encoder.

The method may further include decoding the encoded data signal of the plurality of contents transmitted by the signal processor through a single signal connector, by a decoder.

The method may further include receiving a signal through at least one first signal receiver of the display apparatus.

The method may further include processing a signal received through the at least one first signal receiver of the display apparatus, by a second signal processor.

The method may further include transmitting a signal received through the at least one first signal receiver of the display apparatus, to the signal processing module through the at least one signal connector.

The method may further include selecting a first channel signal by a first tuner of the display apparatus.

The method may further include receiving a signal by at least one second signal receiver of the signal processing module.

The method may further include selecting a second channel signal by a second tuner of the signal processing module.

The method may further include transmitting at least one second channel signal selected by the second tuner of the signal processing module, to the display apparatus; and outputting the at least one second channel signal, together with a first channel signal selected by the first tuner, in a multi-view format through the display unit.

The first tuner may share a single antenna with the second tuner of the signal processing module.

The method may further include transmitting a channel signal received through an antenna to the second tuner of the signal processing module by the first tuner, in a wired or wireless manner.

The method may further include transmitting a channel signal received through an antenna to the first tuner of the display apparatus by the second tuner, in a wired or wireless manner.

The method may further include storing backup data of the signal processing module, in a storage unit of the display apparatus.

The method may further include supplying power to the second power connector by a first power supply of the display apparatus.

The first power supply may supply different voltages to a plurality of the second power connectors.

The method may further include controlling the first power supply to change a second power connector connected to the signal processing module to another second power connector to meet power consumption requirements of the signal processing module when power consumption of the signal processing module exceeds a maximum output value of the connected second power connector.

The method may further include comparing a power consumption of the signal processing module and a power output of the second power connector when the signal processing module is connected to the display apparatus; and displaying a UI for selecting the second power connector meeting the power consumption of the signal processing module out of the plurality of second power connectors, based on a result of the comparing.

The method may further include supplying power, which is input through the second power connector, to each element of the signal processing module by a second power supply of the signal processing module.

According to an aspect of another exemplary embodiment, there is provided a signal processing module located external to a display apparatus, the signal processing module including: a signal connector which connects the signal processing module to the display apparatus and exchanges a signal with the display apparatus; and a signal processor which performs an upgraded signal processing operation, which is upgraded compared to a signal processing operation performed by another signal processor located inside of the display apparatus, on the signal to process the signal.

BRIEF DESCRIPTION OF THE DRAWINGS

The above and/or other aspects will become apparent and more readily appreciated from the following description of the exemplary embodiments, taken in conjunction with the accompanying drawings, in which:

FIG. 5 illustrates an example of a device for receiving broadcasting which provides a plurality of contents to a plurality of users according to an exemplary embodiment;

DETAILED DESCRIPTION OF EXEMPLARY EMBODIMENTS

Figure 1:
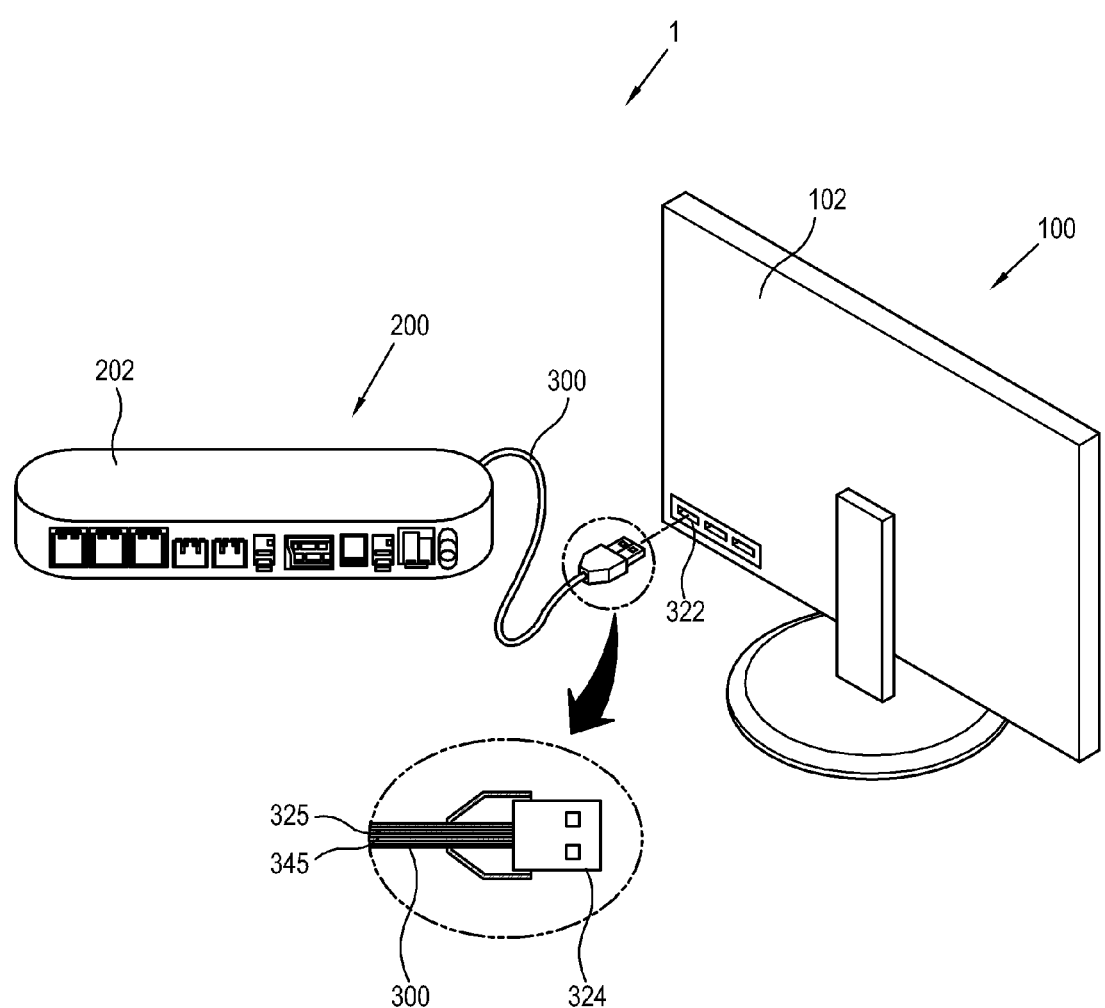
FIG. 1 illustrates an example of a device for receiving broadcasting according to an exemplary embodiment.

Below, exemplary embodiments will be described in detail with reference to accompanying drawings. The exemplary embodiments may be embodied in various forms without being limited to the exemplary embodiments set forth herein. Descriptions of well-known parts are omitted for clarity, and like reference numerals refer to like elements throughout.

Figure 2:
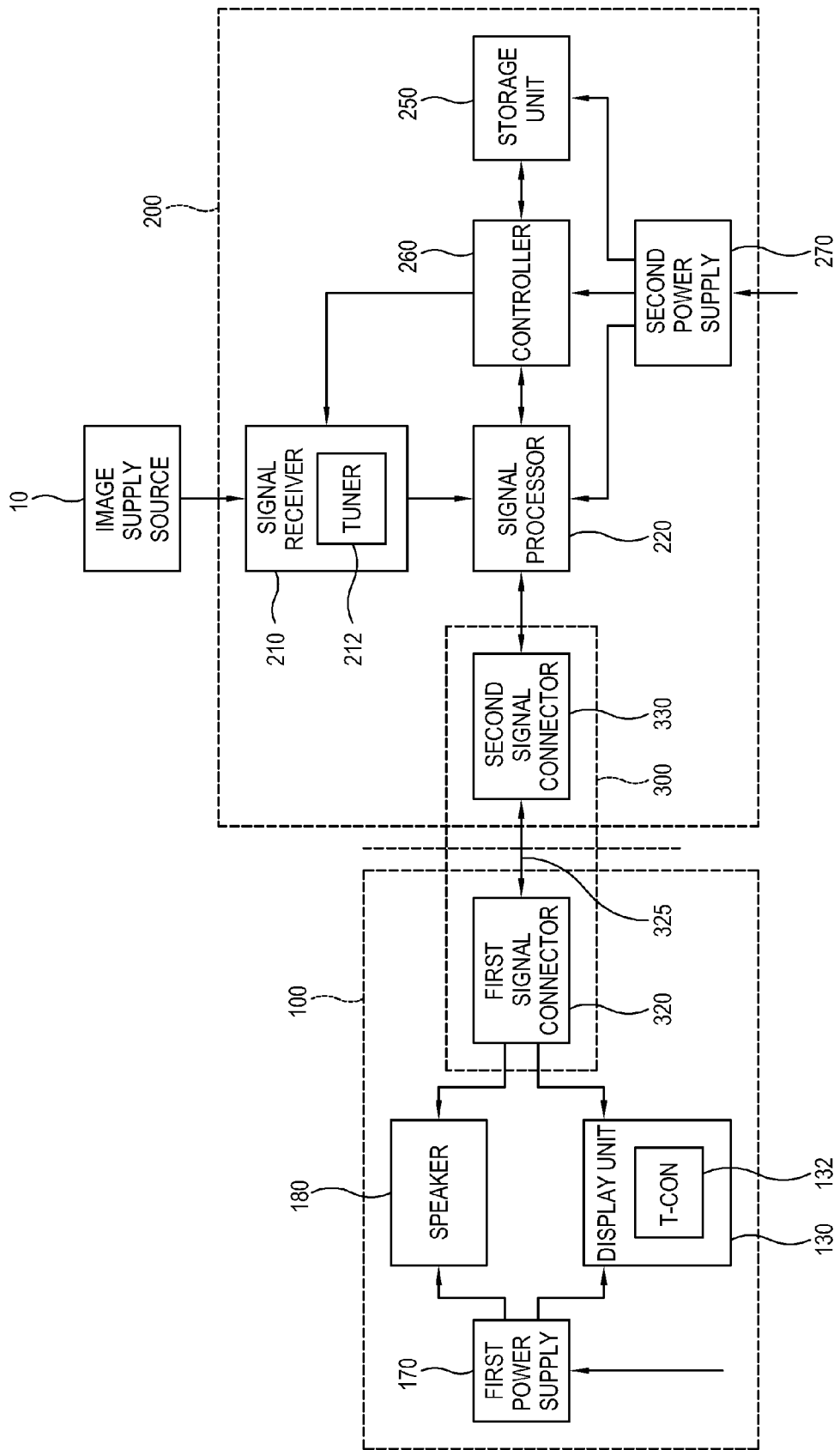
FIG. 2 is a block diagram of the device for receiving broadcasting in FIG. 1.

As shown in FIGS. 1 and 2, a device for receiving broadcasting 1 according to a present exemplary embodiment includes a display apparatus 100 including a cover 102, a signal processing module 200 which is a portable external device located outside the cover 102 and including a casing 202, and signal connectors 300, 322, 324, 325 and 345 which connect the display apparatus 100 and the signal processing module 200 and transmit processed image data.

The device for receiving broadcasting 1 according to the present exemplary embodiment is implemented as a TV which displays a broadcasting image based on broadcasting signals/broadcasting information/broadcasting data transmitted by transmission equipment of a broadcasting station. However, other exemplary embodiments are not limited to the device for receiving broadcasting 1 being implemented as a TV, and the device for receiving broadcasting 1 may be implemented in various ways other than a TV, such as, for example, a computer monitor, etc., as long as the device for receiving broadcasting 1 displays an image.

The type of an image which is displayable by the display apparatus 100 is not limited to a broadcasting image, and may include, for example, a video, a still image, applications, an on screen display (OSD), a graphic user interface (GUI) to control various operations based on signals/data transmitted by external various image sources, and various other types of images.

The display apparatus 100 may include a display unit 130 which displays an image thereon, a speaker 180 which outputs audio, a first power supply 170 which supplies power to the display unit 130 and the speaker 180, a cover 102 which covers a part of the display unit 130 and a timing controller (T-con) 132 which controls a display timing of a received signal.

The signal processing module 200 is housed by the casing 202 and is manufactured to be portable for easy transportation and replacement. The signal processing module 200 is detachably connected to the display apparatus 100 and may process input image and audio signals according to a predetermined signal processing operation. The signal processing module 200 may be connected to the display apparatus 100 by the signal connectors 300, 322, 324, 325 and 345.

The signal connectors 300, 322, 324, 325 and 345 may include a cable 300 which includes a signal connecting line 325 to transmit image signals, audio signals and additional data processed by the signal processing module 200 to the display unit 130 and the speaker 140 of the display apparatus 100, and connection terminals 322 and 324 such as, for example, USB terminals to directly connect the signal processing module 200 to the display apparatus 100 or disconnect the signal processing module 200 therefrom. Accordingly, the display apparatus 100 and the signal processing module 200 are detachably connected to each other through the cable 300 and the connection terminals 322 and 324 which are coupled to both ends, or one of the ends, of the cable 300. In FIG. 1, a power connecting line 345 of power connectors 320 and 330 is shown as being included in the cable 300, together with the signal connecting line 325, although it is understood that the power connecting line 345 is not required to be included in the cable 300.

Even if the display apparatus 100 is replaced by a panel having different characteristics, such as a panel having a larger effective screen or a panel having a different resolution (e.g., full high resolution panel), the existing signal processing module 200 may be used as is. Otherwise, the existing display apparatus 100 may be used as is while the signal processing module 200 may be upgraded or replaced by a new signal processing module.

The signal processing module 200 may include connectors/terminals 322 and 324 for mutual physical and/or electrical connection. In addition, the signal processing module 200 may be connected to the display apparatus 100 in a wireless manner.

Hereinafter, the display apparatus for receiving broadcasting 100 and the signal processing module 200 for receiving broadcasting according to an exemplary embodiment will be described in detail with reference to FIGS. 2 to 4.

As shown therein, the display apparatus 100 may include a display unit 130 to display an image thereon, a speaker 180 to output audio, a first power supply 170 to supply power to the display unit 130 and the speaker 140, and a first signal connector 320 to receive a processed signal from the outside (e.g., an external source).

The first signal connector 320 may include at least one of a universal serial bus (USB) terminal, a high definition multimedia interface (HDMI) terminal, a LAN terminal, an SCART terminal, an RS232 terminal, an optical terminal, and a radio frequency (RF) transmitter. The first signal connector 320 may receive a signal processed by the signal processor 220 of the signal processing module 200, through the cable 300 including the signal connecting line 325, and a connection terminal (not shown). The connection terminal may be detachably connected to the display apparatus 100 and the signal processing module 200, or may be, for example, semi-permanently fixed and connected to one of the display apparatus 100 and the signal processing module 200 and detachably connected to the other one of the display apparatus 100 and the signal processing module 200.

The first signal connector 320 varies corresponding to a standard of a received image signal or the implementation of an image supply source 10 and the display apparatus 100. For example, the first signal connector 320 may receive signals/data corresponding to standards such as HDMI, USB and component standards, and may include at least one of a USB terminal, an HDMI terminal, a LAN terminal, an SCART terminal, an RS232 terminal, an optical terminal, and an RF transmitter corresponding to the standards of the signals/data. The respective connection terminals are connected to various external devices through the cable 300 to perform communication with the external devices via the first signal connector 320. The cable 300 may include the signal connecting line 325 and the power connecting line 345.

The external device which is connected to the first signal connector 320 is not limited to the signal processing module 200. Alternatively, a personal computer (PC), a mobile device such as a smart phone, a game console, or various other types of electronic devices may be connected to the first signal connector 320 instead of or in addition to the signal processing module 200.

The display unit 130 displays an image thereon based on an image signal processed and transmitted by the signal processing module 200 provided outside the cover 102, through the first signal connector 320. The display unit 130 may be implemented as various types of display panels including, for example, liquid crystal, plasma, light-emitting diode (LED), organic light-emitting diode (OLED), surface-conduction electron-emitter, carbon nano-tube, and nano-crystal, but is not limited thereto.

The display unit 130 may further include additional elements depending on its implementation type. For example, when the display unit 130 is implemented as an LCD panel, the display unit 130 may include a backlight unit (not shown) to emit light and a panel driving substrate (not shown) to drive a display panel (not shown).

The display unit 130 may include a timing controller (T-con) 132 to control a timing of a signal processed and transmitted by the first signal connector 320, a line buffer (not shown), a frame memory (not shown), a gray scale conversion circuit (not shown), and a display panel (not shown). The T-con 132 may generate signals such as an enable signal, a start pulse signal, a vertical shift clock signal, a clock signal and a latch pulse signal to display on a display panel an image signal transmitted by the first signal connector 320.

The speaker 180 receives an audio signal processed by the signal processing module 220 through the first signal connector 320 and outputs audio.

The first power supply 170 supplies power which is used by the display apparatus 100. The first power supply 170 generates a voltage to drive the display unit 130 and the speaker 180 and a voltage to drive other peripheral devices. The first power supply 170 may, for example, include a switched-mode power supply (SMPS) or a DC-DC converter, or may include other components used to generate voltage.

The display apparatus 100 may further include a storage unit (not shown). The storage unit of the display apparatus 100 may store backup data of the storage unit 250 of the signal processing module 200 when the connected signal processing module 200 is replaced.

Hereinafter, a configuration of the signal processing module 200 will be described.

The signal processing module 200 may include a second signal connector 330 which is connected to the first signal connector 320 of the display apparatus 100, a signal receiver 210 which receives a signal from an external image supply source 10, a signal processor 220 which processes a signal input by the signal receiver 210, a storage unit 250 which stores therein various types of data/information, a second power supply 270 which supplies power for processing a signal by the signal processing module 200 and a controller 260 which controls overall operations of the signal processing module 200.

The second signal connector 330 is connected to the first signal connector 320 to enable communication between the signal processing module 200 and the display apparatus 100. The second signal connector 330 is configured in accordance with the standard corresponding to the first signal connector 320 to enable connectivity to the first signal connector 320, and may be connected to a connection terminal (not shown) of the first signal connector 320 through the cable 300.

The second signal connector 330 may include connection terminals 322 and 324 which are connected to one end of the cable 300. The connection terminals 322 and 324 are configured in accordance with a standard to communicate with the first signal connector 320, and may be implemented as at least one of a USB terminal, an HDMI terminal, a LAN terminal, a SCART terminal, an RS232 terminal, an optical terminal, and an RF transmitter. However, these are examples only, and the connection between and implementation of the first and second signal connectors 320 and 330 may vary.

The signal receiver 210 may receive video and/or audio signals and/or additional data signals from the external image supply source 10. The signal receiver 210 may include a tuner 212 to receive a broadcasting signal from a broadcasting station through an antenna. Although FIG. 2 depicts the signal receiver 210 as being provided in the signal processing module 200, the signal receiver 210 (including the tuner 212) may alternatively be provided in the display apparatus 100 rather than in the signal processing module 200. The signal which is received by the signal receiver of the display apparatus 100 is transmitted to the signal processing module 200 through the first and second signal connectors 320 and 330. The first and second signal connectors 320 and 330 may be integrated as one signal connector, but according to an exemplary embodiment, are separated from each other to receive signals.

According to other exemplary embodiments, the signal receiver 210 may be included in both the signal processing module 200 and the display apparatus 100.

The signal processor 220 processes an image signal input by the external image supply source 10 and received through the signal receiver 210, according to various preset signal processing operations. The signal processor 220 outputs the processed image signal to the display unit 130 through the first and second signal connectors 320 and 330 to display an image on the display unit 130 based on the image signal.

The signal processing operation of the signal processor 220 may include, but is not limited to, a de-multiplexing operation for dividing a predetermined signal, a decoding operation corresponding to an image format of an image signal, a de-interlacing operation for converting an interlaced image signal into a progressive image signal, a scaling operation for adjusting an image signal into a preset resolution, a noise reduction operation for improving an image quality, a detail enhancement operation, a frame refresh rate conversion operation, etc.

In an exemplary embodiment, the signal processor 220 is implemented as an image processing board (not shown) which is formed by mounting various chipsets (not shown), memories (not shown), electronic parts (not shown), wiring (not shown), etc. on a printed circuit board (PCB) (not shown) to perform the foregoing signal processing operations.

The second power supply 270 outputs power for elements of the signal processing module 200, e.g., the controller 260, the signal processor 220 and the storage unit 250. That is, the second power supply 270 may output a CPU core voltage to drive the controller 260, a memory voltage to drive the storage unit 250 and a voltage to drive other peripheral devices. The second power supply 270 may include an SMPS or a DC-DC converter, although is not limited thereto.

The storage unit 250 stores therein various types of data. In an exemplary embodiment, the storage unit 250 includes a non-volatile memory such as a flash memory or a hard disc drive. The storage unit 250 is accessed by the controller 260, and data stored therein may be read and/or recorded and/or modified and/or deleted and/or updated by the controller 250.

The data stored in the storage unit 250 includes an operating system (OS), various applications which are executed on the OS, image data, and additional data.

The controller 260 may include a CPU and controls various elements of the signal processing module 200. For example, the controller 260 controls the signal processor 220 to process a signal, controls the second signal connector 330 to transmit and receive signals/information/data, accesses the storage unit 250 to read and/or record and/or modify and/or delete and/or update the data and controls the connection between the display apparatus 100 and the signal processing module 200.

Figure 3:
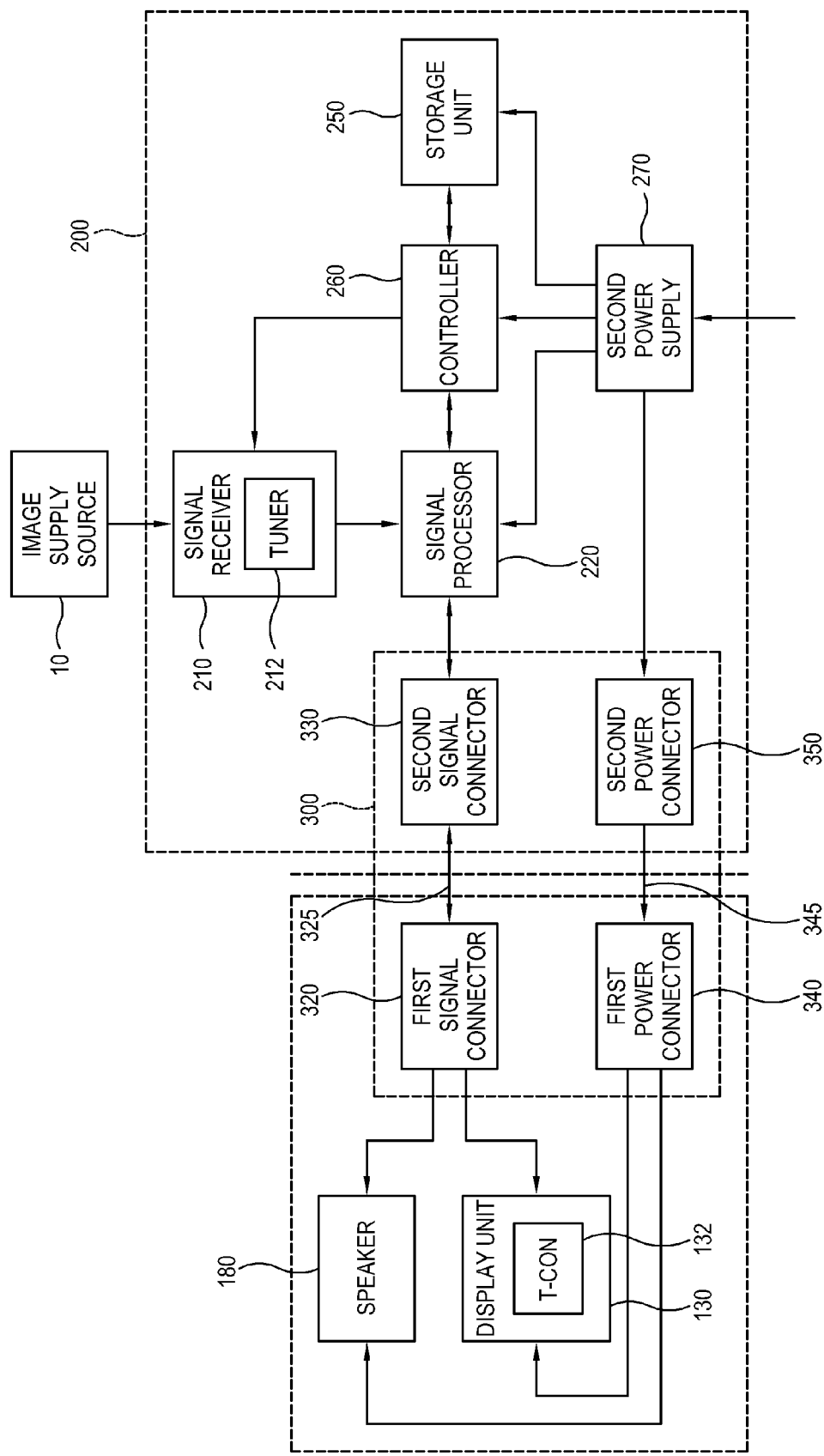
FIG. 3 is a block diagram of a device for receiving broadcasting according to another exemplary embodiment.

FIG. 3 is a block diagram of an apparatus for receiving broadcasting 1 according to another exemplary embodiment. As shown therein, the display apparatus 100 may receive power from the signal processing module 200 through first and second power connectors 340 and 350.

The first and second power connectors 340 and 350 include a power connecting line 345, which may be included in a cable together with the signal connecting line 325. The power connecting line 345 may include a connection terminal (not shown) which is provided separately. In an exemplary embodiment, the connection terminal employs an existing USB terminal. That is, when the cable 300 includes the signal connecting line 325 and the power connecting line 345, the display apparatus 100 and the signal processing module 200 may be connected to each other in a simple manner. Since only the signal processing module 200 uses an external power cable, the display apparatus 100 may be installed without difficulty.

Figure 4:
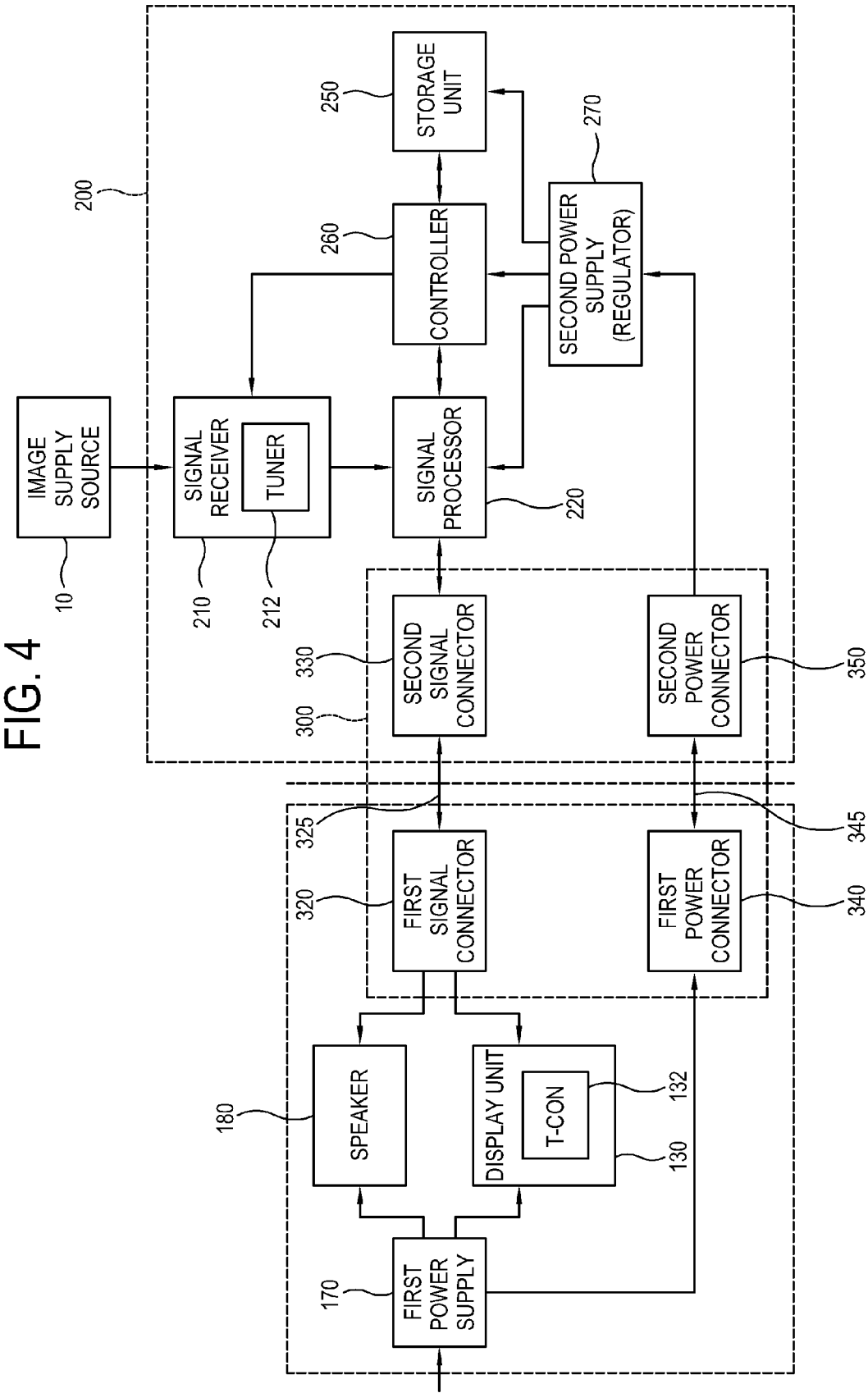
FIG. 4 is a block diagram of a device for receiving broadcasting according to another exemplary embodiment.

FIG. 4 illustrates another exemplary embodiment in which a power supply is provided to the signal processing module 200 by the display apparatus 100 through the first and second power connectors 340 and 350, unlike the case in FIG. 3.

Like the case in FIG. 3, the first and second power connectors 340 and 350 include the power connecting line 345, which may be included in a cable together with the signal connecting line 325. The power connecting line 345 may include a connection terminal (not shown) which is provided separately. In an exemplary embodiment, the connection terminal employs an existing USB terminal. That is, since the cable 300 may include the signal connecting line 325 and the power connecting line 345, the display apparatus 100 and the signal processing module 200 may be connected to each other in a simple manner.

The signal processing module 200 in FIG. 4 may include the second power supply 270 implemented as a regulator. The second power supply 270 may receive power from the first power supply 170 of the display apparatus 100 through the first and second power connectors 340 and 350.

FIG. 5 illustrates a device for receiving broadcasting 1 which provides a plurality of contents to a plurality of users according to an exemplary embodiment.

As shown therein, in an exemplary embodiment, the device for receiving broadcasting 1 includes two sets of glasses 502, designated as glasses 1 and glasses 3, and four contents 1, 2, 3 and 4, although it is understood that more or less than two sets of glasses and four contents may be used according to other exemplary embodiments.

The device for receiving broadcasting 1 alternately displays a plurality of contents and transmits to the glasses 502 a sync signal corresponding to a display timing of each one of the contents. The device for receiving broadcasting 1 outputs an audio signal of each one of the contents to the glasses 502 corresponding to the plurality of contents. The device for receiving broadcasting 1 may be implemented as various devices which include the display apparatus 100, such as a TV, a mobile phone, a PDA, a laptop computer, a monitor, a tablet PC, an e-book, an electronic frame, a kiosk, etc.

The glasses 1 control an open timing of left eye and right eye shutter glasses according to a sync signal transmitted by the device for receiving broadcasting 1. That is, the glasses 1 open the left eye and right eye shutter glasses during the time during which the content is displayed according to information included in the receive sync signal, and enables a user to view a video of one of the plurality of contents.

The glasses 1 may open the left eye and right eye shutter glasses during the display time of a content 1 of a plurality of contents 1 to 4 which are displayed alternately, according to a sync signal transmitted by the device for receiving broadcasting 1.

As the glasses 1 open the left eye and right eye shutter glasses during the display time of the content 1, a user wearing the glasses 1 may view a video of the content 1 of the plurality of contents 1 to 4 which is displayed by the device for receiving broadcasting 1.

The device for receiving broadcasting 1 which alternately displays the contents 1 to 4 may output an audio signal of the contents 1 to 4 corresponding to the display timing of the contents 1 to 4. As described above, the glasses 1 which open the left eye and right eye shutter glasses at the timing of displaying the content 1 may receive an audio signal from the device for receiving broadcasting 1 and output the audio signal of the content 1. Thus, a user may listen to the audio of the content 1 while viewing the video of the content 1 through the glasses 1 he/she wears.

Other glasses 3 may open left eye and right eye shutter glasses at the timing of displaying a content 3 of contents which are displayed alternately, according to a sync signal transmitted by the device for receiving broadcasting 1. The device for receiving broadcasting 1 which alternately displays the contents 1 to 4 may output an audio signal of the contents 1 to 4 corresponding to the display timing of the contents 1 to 4. Accordingly, the glasses 3 which open the shutter glasses at the timing of displaying the content 3 may receive an audio signal from the device for receiving broadcasting 1 and output the audio signal of the content 3. Thus, a user may not only view the video of the content 3 but also listen to the audio of the content 3 through the glasses 3 he/she wears.

The system including the device for receiving broadcasting 1 providing the plurality of contents 1, 2, 3 and 4 and the glasses 502 which are used to view the plurality of contents of the device for receiving broadcasting 1 has been explained briefly. Exemplary embodiments relate to a connection configuration for displaying a multi-view display of a plurality of contents and a power supply implemented by using a single connection line in the device for receiving broadcasting 1.

Hereinafter, a configuration of the device for receiving broadcasting 1 for supporting a multi-view display of the plurality of contents and a power supply will be described in detail.

Figure 6:
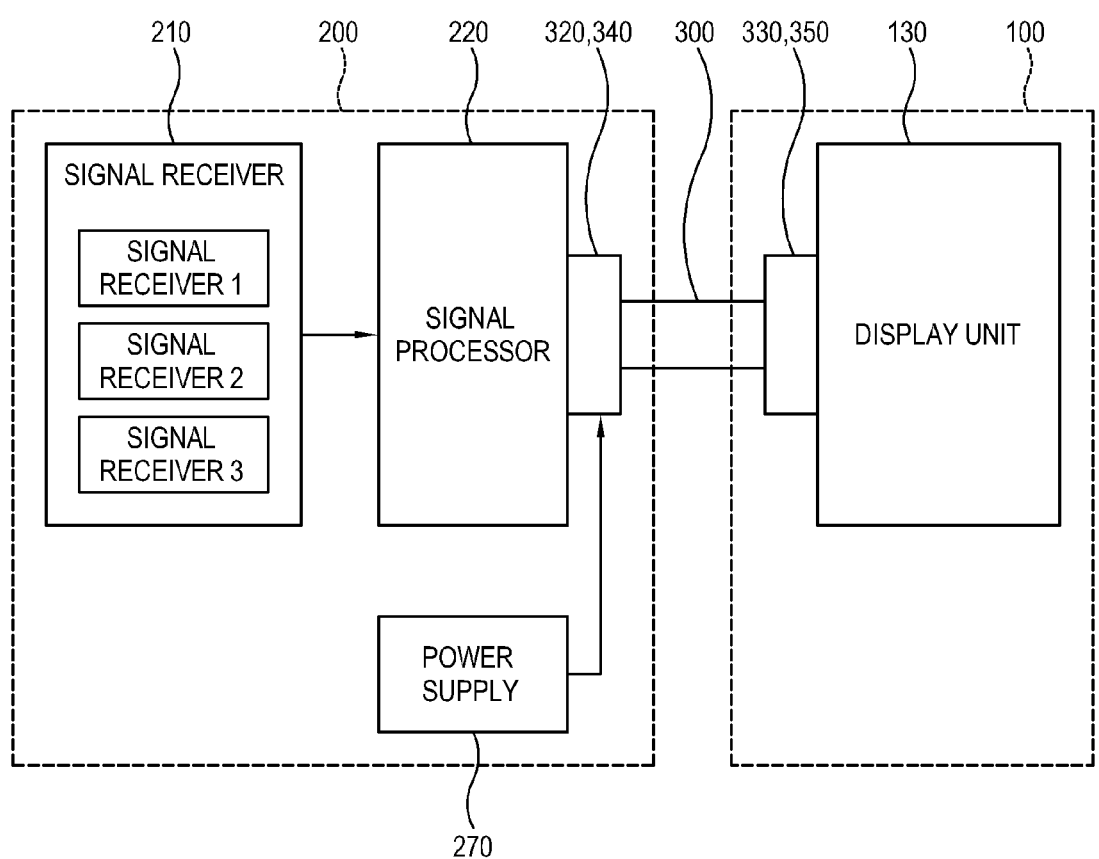
FIG. 6 is a block diagram of a display apparatus according to an exemplary embodiment.

FIG. 6 is a block diagram of the device for receiving broadcasting 1 which supports a multi-view display (a multi-view format) according to an exemplary embodiment.

As shown therein, the device for receiving broadcasting 1 may include the signal processing module 200 and the display apparatus 100 which are connected by the cable 300. The signal processing module 200 may include the signal receiver 210, the signal processor 220 and the power supply 270. The display apparatus 100 may include the display unit 130 to display thereon an image transmitted by the signal processing module 200.

The signal receiver 210 may include a plurality of signal receivers 1, 2, 3 . . . to receive a plurality of different contents. If the plurality of contents is received by the signal receiver 210, the signal processor 220 processes the plurality of contents to output video data, audio data and additional data included in the contents. The power supply 270 supplies power to operate elements. The cable 300 connects the signal processor 220 and the display unit 130 and transmits data of contents processed by the signal processor 220 and power supplied by the power supply 270 to drive the display apparatus 100, to the display apparatus 100. According to other exemplary embodiments, when the power supply 270 is provided in the display apparatus 100 rather than in the signal processing module 200, the power may be supplied by the display apparatus 100 to the signal processing module 200.

As described above, the plurality of signal receivers 1, 2 and 3 receive a plurality of different contents and may, for example, receive first to third contents, respectively, from the outside (e.g., an external source). According to the exemplary embodiment, the signal receivers 1 and 2 may receive contents through different broadcasting channels. More specifically, the signal receivers 1 and 2 may include a tuner, a demodulator, a modulator, an equalizer and a decoder to receive contents from different broadcasting channels. Elements of the signal receivers 1, 2 and 3 are known technologies and thus description thereof will be omitted. It is understood that the signal processing module 200 may include more or less than three signal receivers according to other exemplary embodiments.

The signal receiver 210 may receive contents through a source device such as a web server or a playing device such as a DVD via at least one interface among various types of interfaces such as, for example, CART, AV, HDMI, Component and USB interfaces.

When different contents are received through the signal receivers 1, 2 and 3, the signal processor 220 processes the received contents to be output through the display unit 130. Although one signal processor 220 is illustrated in FIG. 6, according to other exemplary embodiments, a plurality of the signal processors 220 is provided in a number corresponding to the signal receivers 1, 2 and 3. The signal processor 220 processes the contents received through the signal receivers 1, 2 and 3 to output video data, audio data and additional data of the contents. The signal processor 220 may be configured as in FIG. 7.

Figure 7:
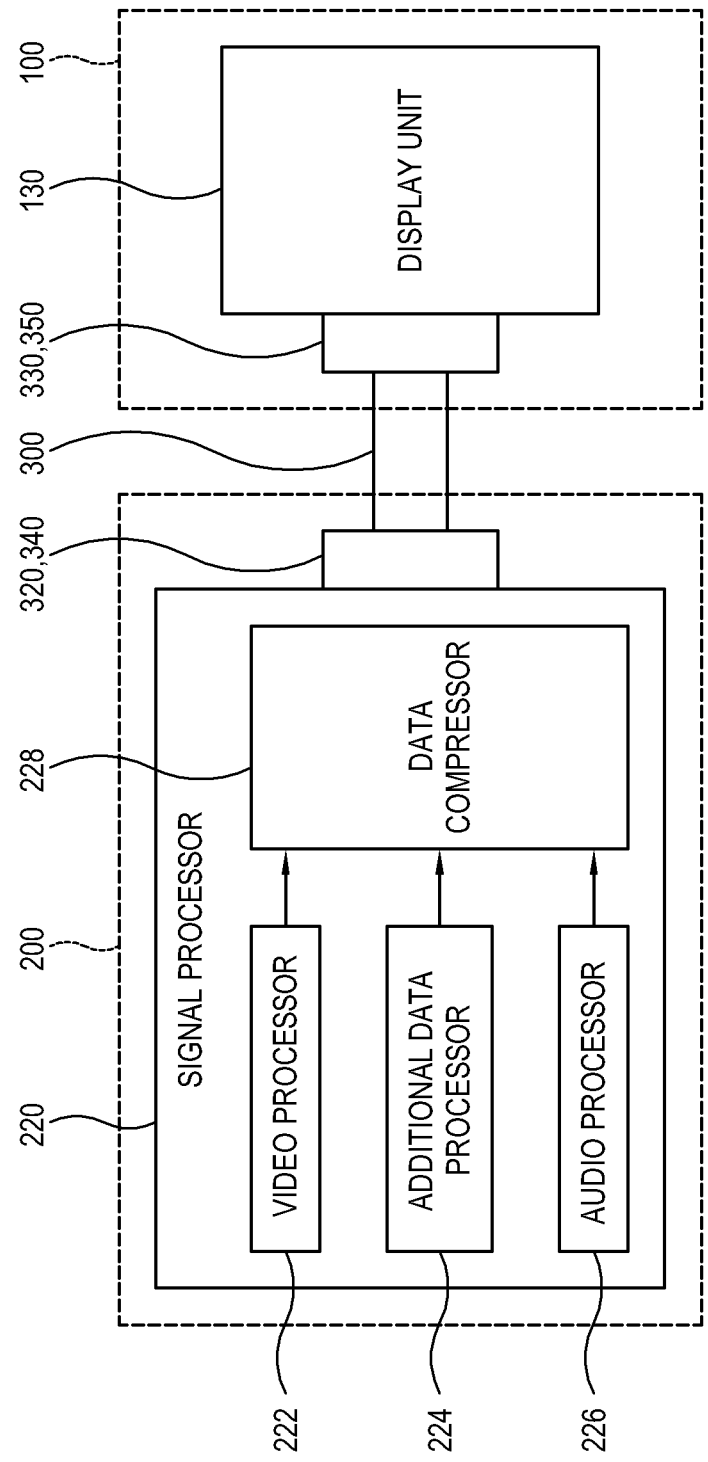
FIG. 7 is a block diagram of a signal processing module according to an exemplary embodiment.

As shown in FIG. 7, the signal processor 220 converts the video data, audio data and additional data of the plurality of received contents, and then compresses and transmits the converted video data, audio data and additional data to the display unit 130. The signal processor 220 may perform the foregoing operations through a video processor 222, an audio processor 226, an additional data processor 224 and a data compressor 228.

The video processor 222 detects video data included in the received contents, and converts the detected video data to display an image frame of the video data on the display unit 130. The audio processor 226 detects audio data included in the received contents and converts the detected audio data so that the audio data are transmitted to the glasses 502 through the display unit 130 and output as an audible sound by the glasses. The additional data processor 224 detects additional data such as, for example, an electronic program guide (EPG) and subtitles included in the received contents. Then, the additional data processor 224 adds the additional data to an image frame corresponding thereto to display the additional data on the display unit 130.

The technology for converting the video data, audio data and additional data of the contents by the video processor 222, audio processor 226 and additional data processor 224 is known and a detailed description thereof will be omitted.

The data compressor 228 compresses the video data, audio data and additional data processed by the video processor 222, audio processor 226 and additional data processor 224, respectively. As described above, the signal processor 220 and the display unit 130 are connected to each other through the single cable 300. Thus, the data compressor 228 may compress the video data, audio data and additional data processed by the video processor 222, audio processor 226 and additional data processor 224, respectively, to a size which is appropriate to be transmitted to the display unit 130 through the single cable 300. The signal processor 220 may transmit the video data, audio data and additional data compressed by the data compressor 228 to the display unit 130, through the single cable 300.

The cable 300 which connects the signal processor 220 and the display unit 130 and supplies the data processed by the signal processor 220 and power from the power supply 270 to the display apparatus 100 may include a first signal connector 320, a second signal connector 330, a first power connector 340 and a second power connector 350.

The first signal connector 320 may include a tab or a receptacle terminal provided in the signal processor 220 and a receptacle or a tab terminal provided in a first end of the cable 300 to be connected thereto or disconnected therefrom.

The second signal connector 330 may include a tab or a receptacle terminal provided in the display unit 130 and a receptacle or a tab terminal provided in a second end of the cable 300 to be connected thereto or disconnected therefrom.

The first power connector 340 may include a tab or a receptacle terminal provided in the signal processor 220 and a receptacle or a tab terminal provided in a first end of the cable 300 to be connected thereto or disconnected therefrom.

The second power connector 350 may include a tab or a receptacle terminal provided in the display unit 130 and a receptacle or a tab terminal provided in a second end of the cable 300 to be connected thereto or disconnected therefrom.

The first and second signal connectors 320 and 330 may be configured according to various standards, such as, for example, USB, HDMI, LAN, SCART, RS232, optical terminal standards or RF transmitter standards, and may include an additional connection terminal.

The first and second power connectors 340 and 350 may transmit power between the signal processing module 200 and the display apparatus 100 by using an existing USB terminal or an additional terminal.

The device for receiving broadcasting 1 according to an exemplary embodiment may transmit to the display unit 130 the compressed video data, audio data and additional data from the signal processor 220 and power from the power supply 270 through the single cable 300. Hereinafter, the connection type of the cable 300 which transmits the compressed video data, audio data and additional data from the signal processor 220 and the power from the power supply 270 to the display unit 130 will be described in detail.

Figure 8:
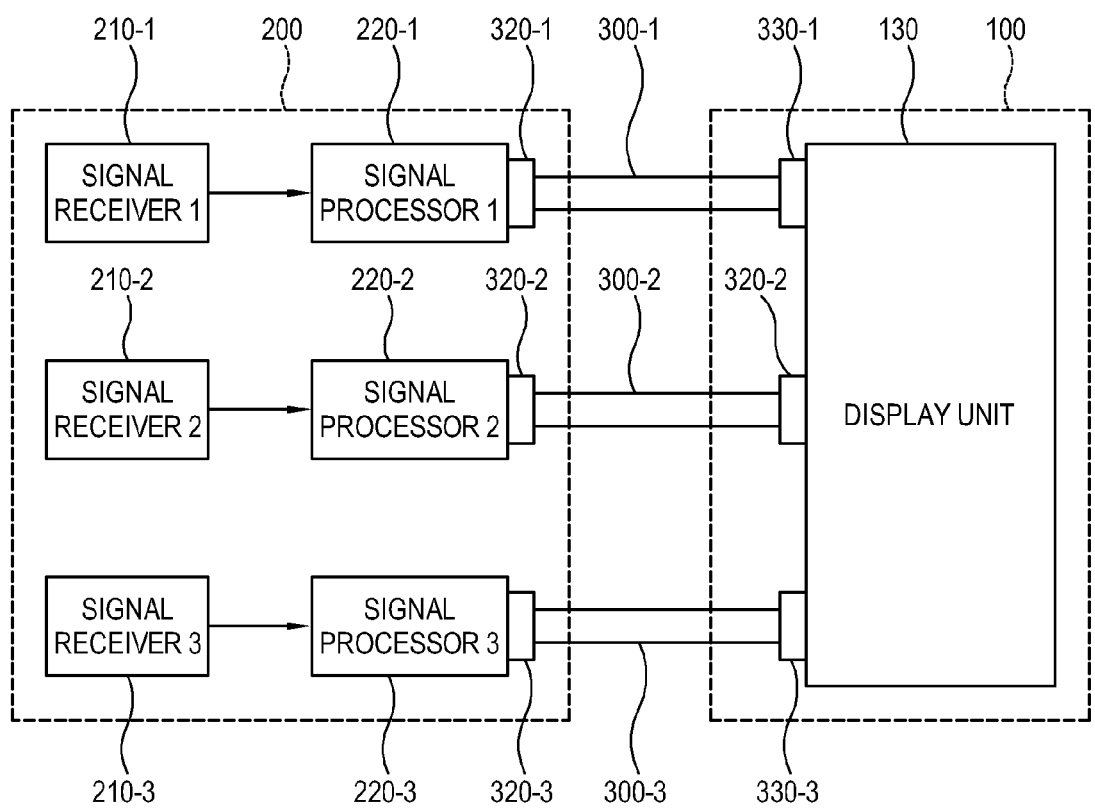
FIG. 8 illustrates a first example of a connection method to connect a display apparatus and a signal processing module according to an exemplary embodiment.

FIG. 8 illustrates a first example of a connection method to connect the signal processor 220 and the display unit 130 of the device for receiving broadcasting 1 according to an exemplary embodiment.

As shown therein, the display unit 130 outputs, as video and audio, contents received by at least one of signal receivers 1, 2 and 3 (210-1, 210-2 and 210-3, respectively). More specifically, if a first content is received through the signal receiver 1 (210-1) of the signal receivers 1, 2 and 3 (210-1, 210-2 and 210-3, respectively), the signal processor 1 (220-1) may process video data, audio data and additional data of the received first content to be output and compress the processed video data, audio data and additional data. The cable 300-1 which is connected to the signal processor 1 (220-1) may be used to transmit to the display unit 130 the compressed video data, audio data and additional data of the first content from the signal processor 220-1.

More specifically, the signal processor 1 (220-1) outputs the compressed video data, audio data and additional data of the first content through the first signal connector 1 (320-1). Accordingly, the cable 300-1 receives the compressed video data, audio data and additional data of the first content from the signal processor 1 (220-1) through the first signal connector 320-1. Then, the cable 300-1 is used to transmit the compressed video data, audio data and additional data of the first content to the second signal connector 330-1.

The display unit 130 may output, as video and audio, the compressed video data, audio data and additional data of the first content transmitted by the cable 300-1.

The display unit 130 according to exemplary embodiments may increase the number of the cables 300-1, 300-2 and 300-3 corresponding to the number of a plurality of contents and output the plurality of contents in a multi-view display. In this case, the cables 300-1, 300-2 and 300-3 may be provided in the number corresponding to the number of contents included in the multi-view frame. Accordingly, the number of the first signal connectors 320-1, 320-2 and 320-3 and the second signal connectors 330-1, 330-2 and 330-3 which are connected to each other through the cables 300-1, 300-2 and 300-3 may correspond to the number of contents included in the multi-view frame. The cables 300-1, 300-2 and 300-3 may be added or separated depending on the number of contents displayed in a multi-view frame.

As shown therein, when first to third contents are received through the signal receivers 210-1, 210-2 and 210-3, the cables 300-1, 300-2 and 300-3 may transmit data included in the first to third contents to the display unit 130. More specifically, when the first to third contents are received through the signal receivers 210-1, 210-2 and 210-3, the first signal processors 1, 2 and 3 (220-1, 220-2 and 220-3) process the video data, audio data and additional data included in the first to third contents transmitted by the signal receivers 1, 2 and 3 (210-1, 210-2 and 210-3). The signal processors 1, 2 and 3 (220-1, 220-2 and 220-3) compress the processed video data, audio data and additional data of the first to third contents to be transmitted through the cables 300-1, 300-2 and 300-3.

The signal processors 1, 2 and 3 (220-1, 220-2 and 220-3) transmit to the display unit 130 the compressed video data, audio data and additional data of the first to third contents through the cables 300-1, 300-2 and 300-3. The cables 300-1, 300-2 and 300-3 may transmit power from the power supply 270 (refer to FIG. 6) to the second power connector 350 (refer to FIG. 6). Also, the signal processing module 200 may receive power from the display apparatus 100, or both the signal processing module 200 and the display apparatus 100 may include a power supply, respectively.

The display apparatus 100 according to an exemplary embodiment supplies processed video data, audio data and additional data of the contents and power to the display unit 130 through the single cable 300 to thereby implement a simple connection between the signal processor 220 which processes contents and the display unit 130. When a plurality of contents is received, the device for receiving broadcasting 1 according to an exemplary embodiment may increase the number of the cables 300 corresponding to the plurality of received contents to connect the signal processor 220 and the display unit 120 and to support a multi-view display of the plurality of contents.

More specifically, video data and additional data of first to third contents which are input through the plurality of second signal connectors 330-1, 330-2 and 330-3 may be output in an image frame. Accordingly, the display unit 130 multiplexes an image frame of the first to third contents output through the plurality of second signal connectors 330-1, 330-2 and 330-3) to be alternately displayed. Then, the display unit 130 displays the multiplexed image frame of the first to third contents in a multi-view frame. The multi-view frame refers to frame data which are configured for a plurality of users to view a plurality of contents, respectively. When the multi-view frame is output, the glasses 502 open the left eye and right eye shutter glasses corresponding to the output timing of the image frame of a synchronized content out of the first to third frames so that a plurality of users may view videos of different contents.

When video data and additional data of the first to third contents are input through the plurality of second signal connectors 330-1, 330-2 and 330-3, the display unit 130 may transmit audio data of the first to third contents to a plurality of glasses. For example, the display unit 130 may transmit audio data through different frequency channels or generate and transmit an audio signal stream mixing a plurality of audio data in a pattern corresponding to an arrangement pattern of the image frame of the first to third contents. Accordingly, a plurality of users wearing the glasses 502 may not only view videos of different contents but also listen to audio relating to the contents through the glasses 502.

Figure 9:
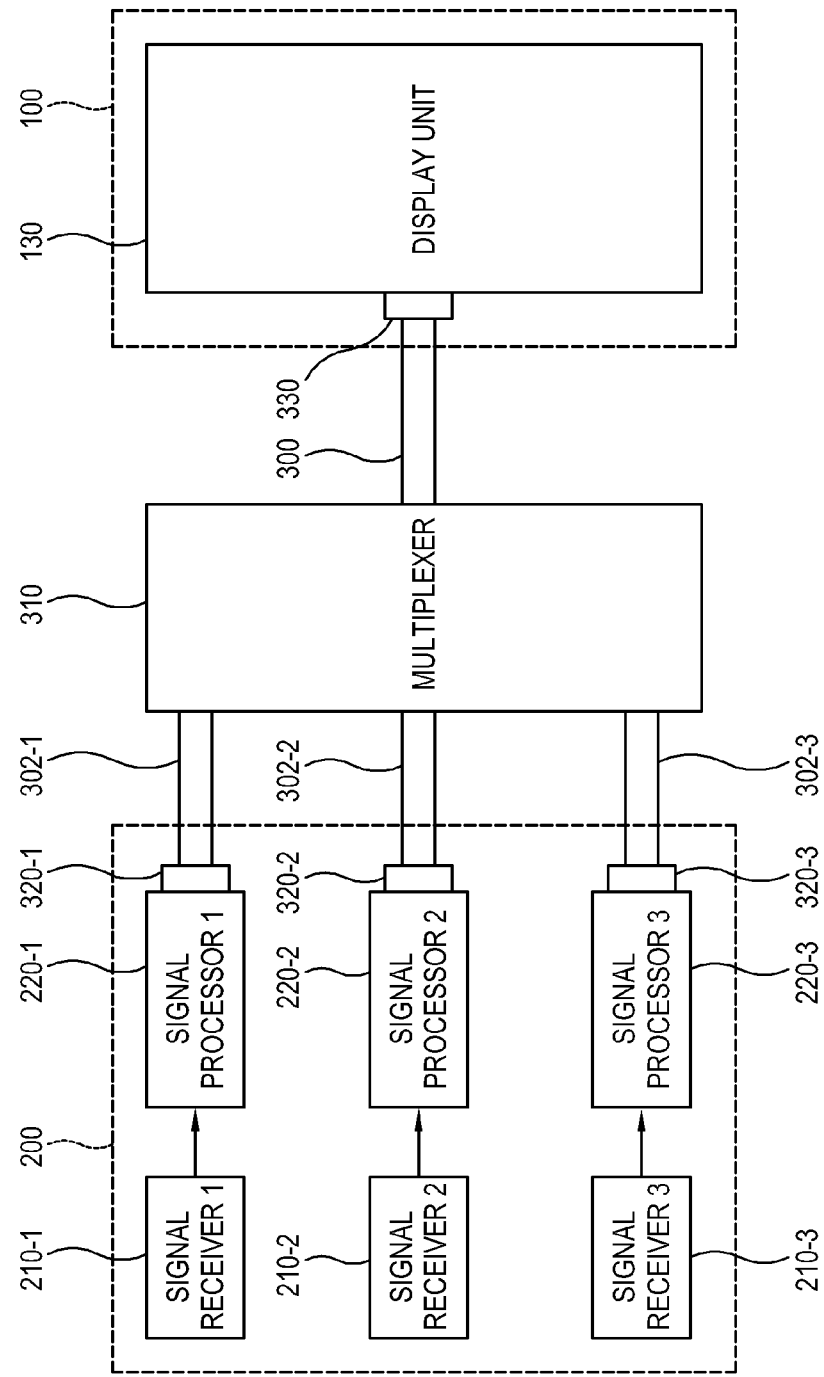
FIG. 9 illustrates a second example of a connection method to connect a display apparatus and a signal processing module according to another exemplary embodiment.

FIG. 9 illustrates a second example of a connection method to connect the signal processing module 200 and the display apparatus 100 of the device for receiving broadcasting 1 according to an exemplary embodiment.

As shown therein, the cable 300 may be connected to a multiplexer 310 which is connected to a first signal connector 320-1 of the signal processor 1 (220-1), a first signal connector 320-2 of the signal processor 2 (220-2) and a first signal connector 320-3 of the signal processor 3 (220-3), and the second signal connector 330.

As shown therein, the multiplexer 310 multiplexes data output by the plurality of signal processors 1, 2 and 3 (220-1, 220-2 and 220-3) of the signal processing module 200. The single cable 300 connects the multiplexer 310 and the second signal connector 330 and transmits the data multiplexed by the multiplexer 310 to the display unit 130.

When first to third contents are received through the signal receivers 1, 2 and 3 (210-1, 210-2 and 210-3), the signal processors 1, 2 and 3 (220-1, 220-2 and 220-3) process video data, audio data and additional data of the first to third contents. The signal processors 1, 2 and 3 (220-1, 220-2 and 220-3) compress the processed video data, audio data and additional data of the first to third contents to be transmitted.

The signal processors 1, 2 and 3 (220-1, 220-2 and 220-3) output the compressed video data, audio data and additional data of the first to third contents to the multiplexer 310. The multiplexer 310 multiplexes the compressed data of the first to third contents and then transmits the multiplexed data to the second signal connector 330 through the cable 300 connecting the multiplexer 310 and the second signal connector 330.

The multiplexer 310 may receive power for its multiplexing operation from the first power connector 340 of the signal processing module 200 and the cables 302-1, 302-2 and 302-3 or from the second power connector 350 and the single cable 300. The multiplexer 310 may be provided in the signal processing module 200, in which case, the multiplexer 310 may receive power from the power supply 270 of the signal processing module 200.

The device for receiving broadcasting 1 according to an exemplary embodiment multiplexes data of the first to third contents through the multiplexer 310, and transmits the multiplexed data to the display unit 130 through the single cable 300 to thereby implement a simple connection between the plurality of signal processors 1, 2 and 3 (220-1, 220-2 and 220-3) and the display unit 130.

The display unit 130 may separate the multiplexed data of the first to third contents into video data, audio data and additional data, and then output video and audio based on the separated data.

More specifically, the video data and additional data which are separated from the multiplexed data may be output in an image frame. Accordingly, the display unit 130 multiplexes an image frame of the first to third contents to be alternately displayed. Then, the display unit 130 displays the multiplexed image frame of the first to third contents in a multi-view frame. The multi-view frame refers to frame data which are configured for a plurality of users to view a plurality of contents, respectively. If the multi-view frame is output, the glasses 502 open the left eye and right eye shutter glasses corresponding to the output timing of the image frame of a synchronized content out of the first to third frame so that a plurality of users may view videos of different contents.

When the audio data are separated from the multiplexed data, the display unit 130 may transmit audio data of the first to third contents to the plurality of glasses 502. For example, the display unit 130 may transmit audio data through different frequency channels or generate and transmit an audio signal stream mixing a plurality of audio data in a pattern corresponding to an arrangement pattern of the image frame of the first to third contents. Accordingly, a plurality of users wearing the glasses 502 may not only view videos of different contents but also listen to audios relating to the contents through the glasses 502.

Figure 10:
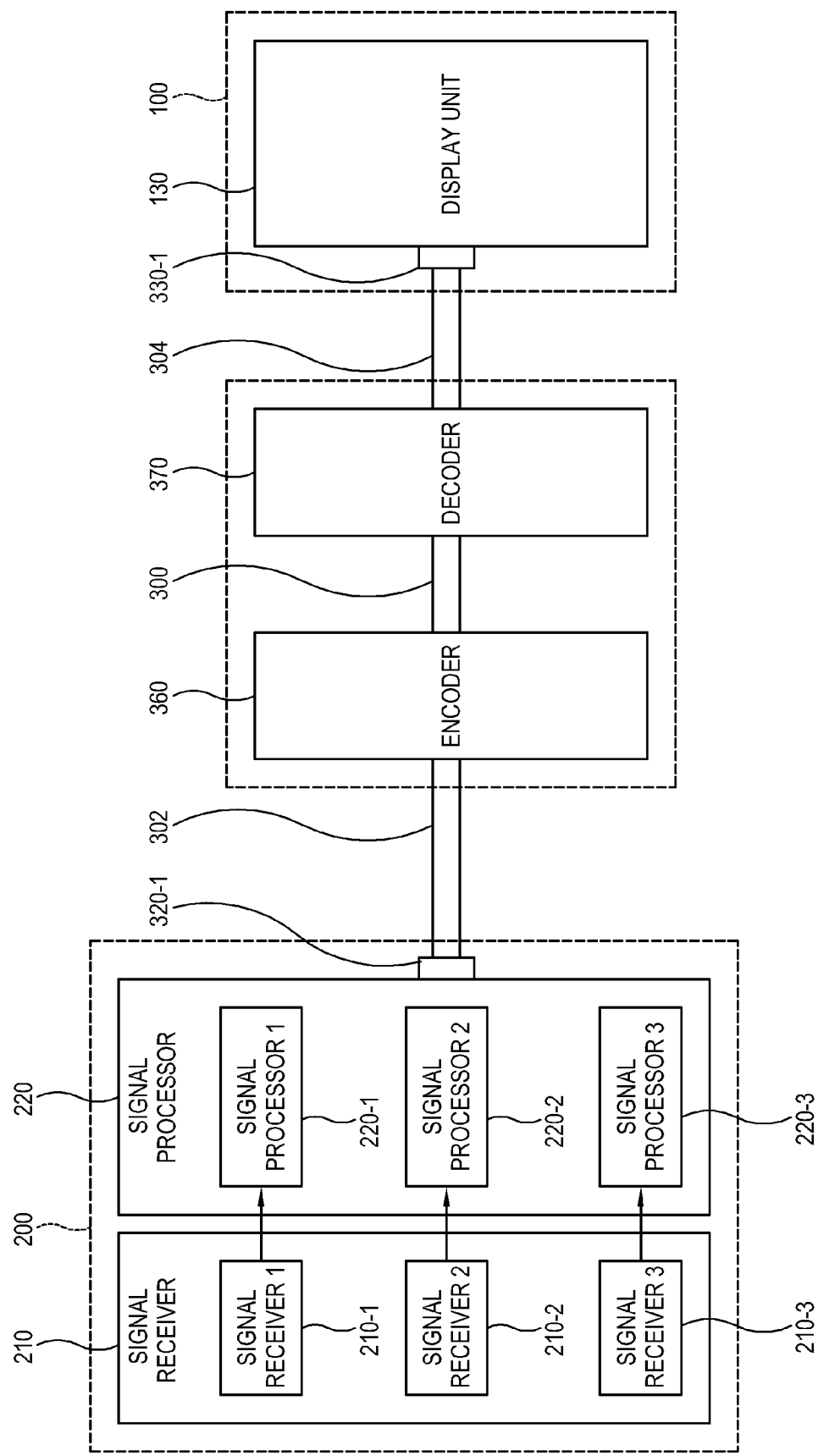
FIG. 10 illustrates a third example of a connection method to connect a display apparatus and a signal processing module according to another exemplary embodiment.

FIG. 10 illustrates a third example of a connection method to connect the signal processing module 200 and the display apparatus 100 of the device for receiving broadcasting 1 according to an exemplary embodiment.

As shown therein, the cable 300 includes an encoder 360 and a decoder 370.

More specifically, the encoder 360 encodes data transmitted by the plurality of signal processors 1, 2, and 3 (220-1, 220-2 and 220-3) of the signal processing module 200, and the decoder 370 decodes the data encoded by the encoder 360.

As shown therein, when first to third contents are received through the signal receivers 1, 2 and 3 (210-1, 210-2 and 210-3), the signal processors 1, 2 and 3 (220-1, 220-2 and 220-3) process video data, audio data and additional data included in the first to third contents transmitted by the signal receivers 1, 2 and 3 (210-1, 210-2 and 210-3). The signal processors 1, 2 and 3 (220-1, 220-2 and 220-3) compress the processed data of the first to third contents to be output to the encoder 360 through the first signal connector 320-1, and the compressed data are transmitted to the encoder 360.

A second cable 302 transmits power from the power supply 270 (refer to FIG. 6) to the encoder 360 together with the compressed data of the first to third contents. Accordingly, the encoder 360 is driven by the power supplied through the second cable 302 and encodes the compressed data of the first to third contents to be transmitted to the decoder 370 through the cable 300. The encoder 360 may transmit both the power supplied through the second cable 302 and the encoded data, to the decoder 370.

When the encoded data and power are transmitted by the encoder 360, the decoder 370 is driven by the transmitted power and decodes the encoded data. Then, the decoder 370 transmits the decoded data and the supplied power to a third cable 304, and the third cable 304 outputs the decoded data and power to the display unit 100. In an exemplary embodiment, the display unit 100 includes, for example, the second signal connector 340 (see FIG. 7) and the second power connector 350 (see FIG. 7), and receives the decoded data and power at the second signal connector 340 and the second power connector 350, respectively. When the decoded data and power are input, the display unit 130 is driven by the supplied power and may output the data of the first to third contents. The device for receiving broadcasting 1 according to an exemplary embodiment supplies the data of the plurality of contents and power to the display unit 130 through the single cables 300, 302 and 304 to thereby implement a simple connection relationship between the signal processor 220 which processes contents and the display unit 130, and to support a multi-view display.

The operation of the display unit 130 which outputs the data of the first to third contents into video and audio has been explained above, and thus will not be repeated again. The cable 300 which connects the plurality of signal processors 1, 2 and 3 (220-1, 220-2 and 220-3) and the display unit 130 includes the encoder 360 and the decoder 370, but other exemplary embodiments are not limited to such a configuration. Alternatively, the encoder 360 may be included in the signal processing module 200 and encode data, and the decoder 370 may be included in the display unit 130 and decode the encoded data.

Hereinafter, a method of supporting a multi-view display of a plurality of contents and supplying power through the single cable in the device for receiving broadcasting 1 according to an exemplary embodiment will be described in detail.

Figure 11:
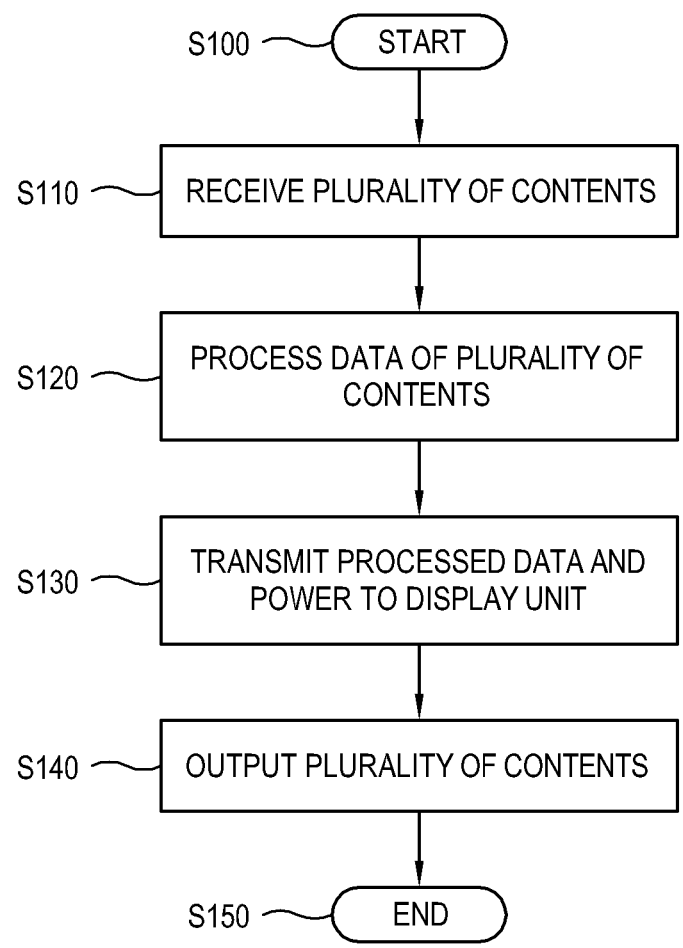
FIG. 11 is a flowchart showing a method for displaying a multi-view display by a device for receiving broadcasting according to an exemplary embodiment.

FIG. 11 is a flowchart of a multi-view display method of the display apparatus according to an exemplary embodiment.

As shown therein, the signal processing module 200 receives a plurality of different contents at operation S110. When the plurality of different contents is received, the signal processor 220 processes video data, audio data and additional data of the plurality of contents to be output at operation S120. When the video data, audio data and additional data of the plurality of contents are processed by the signal processor 220, the processed data and the power supplied from the outside are transmitted to the display unit 130 at operation S130. Then, the display unit 130 is driven by the power transmitted by the signal processor 220 and outputs the processed data of the plurality of contents at operation S140.

As described above, when the plurality of different contents is received, the signal processing module 200 processes the plurality of contents through the signal processor 220 to output the contents through an output unit. For example, when the first to third contents are received, the signal processor 220 processes the video data, audio data and additional data of the first to third contents through the signal processors 1, 2 and 3 (220-1, 220-2 and 220-3). The operation of processing the contents by the signal processor 220 to be output and transmitting the contents to the display unit 130 has been explained in detail with reference to FIGS. 7 to 10, and thus will not be repeated again.

Figure 12:
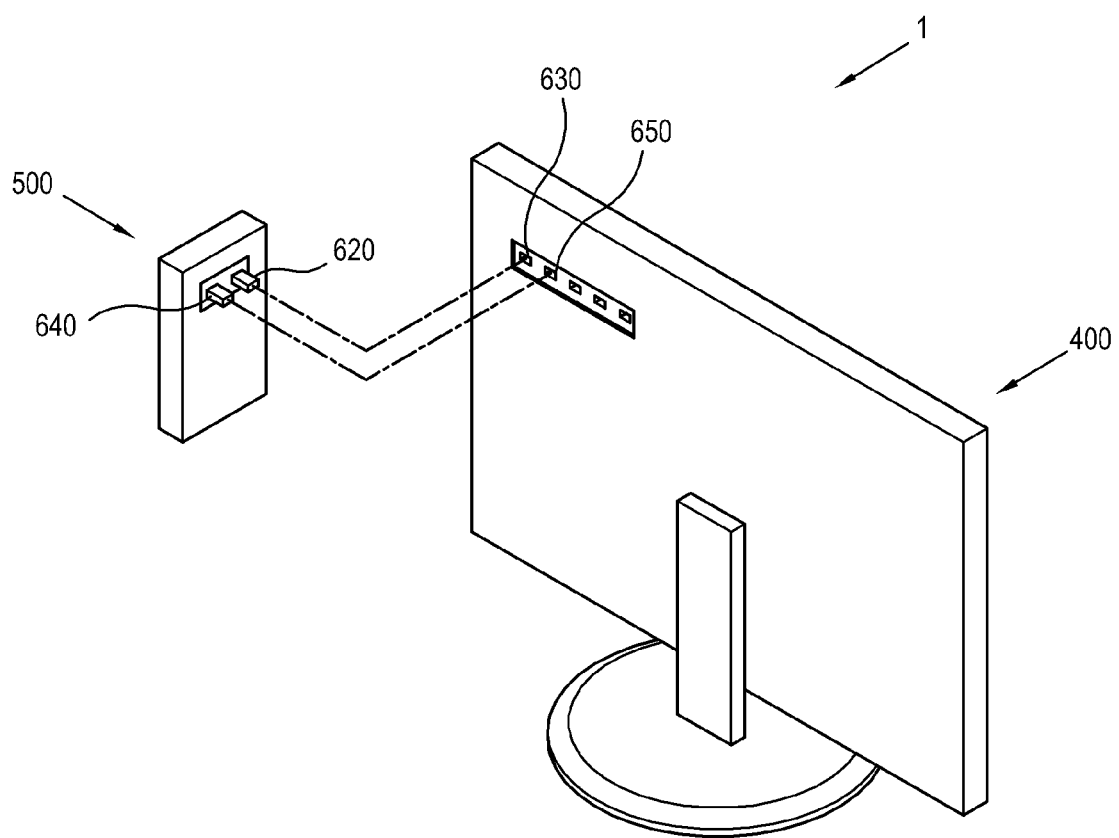
FIG. 12 illustrates an example of a device for receiving broadcasting according to another exemplary embodiment.

FIG. 12 illustrates an example of a device for receiving broadcasting 1 according to another exemplary embodiment.

As shown therein, the device for receiving broadcasting 1 includes a display apparatus 400 which processes an image signal supplied by an external image supply source 10-1 and displays an image based on the processed image signal, and a signal processing module 500 which upgrades hardware of the display apparatus 400.

The display apparatus 400 of the device for receiving broadcasting 1 according to the present exemplary embodiment is implemented as a TV which displays a broadcasting image based on broadcasting signals/broadcasting information/broadcasting data transmitted by transmission equipment of a broadcasting station. However, other exemplary embodiments are not limited to the implementation of the display apparatus 400 as a TV, and the display apparatus 400 may be implemented in various ways, including a computer monitor, etc., as long as the display apparatus 400 displays an image.

The type of an image which is displayable by the display apparatus 400 is not limited to a broadcasting image, and may include a video, a still image, applications, an on screen display (OSD), a graphic user interface (GUI) to control various operations based on signals/data transmitted by external various image sources, and various other types of images.

A signal processing module 500 is connected to the display apparatus 400 for communication. The signal processing module 500 upgrades existing hardware of the connected display apparatus 400 so that the upgraded hardware of the display apparatus 400 processes an image signal and displays an image with improved quality.

The signal processing module 500 may be connected to the display apparatus 400 in a wired and/or wireless manner. The signal processing module 500 according to the present exemplary embodiment may be connected to the display apparatus 400 in a wired manner to exchange data/information/signals/power with the display apparatus 400. The signal processing module 500 and the display apparatus 400 may include connectors/terminals 620, 640, 630 and 650 for mutual physical and/or electric connection.

In certain exemplary embodiments, the display apparatus 400 may solely process an image signal transmitted from the outside, according to a signal processing operation, and display an image based on the processed image signal. However, according to the present exemplary embodiment, the hardware and/or software of the device for receiving broadcasting 1 which performs the signal processing operation are upgraded by the connection of the display apparatus 400 and the signal processing module 500, and accordingly, an image with improved quality may be provided.

Figure 13:
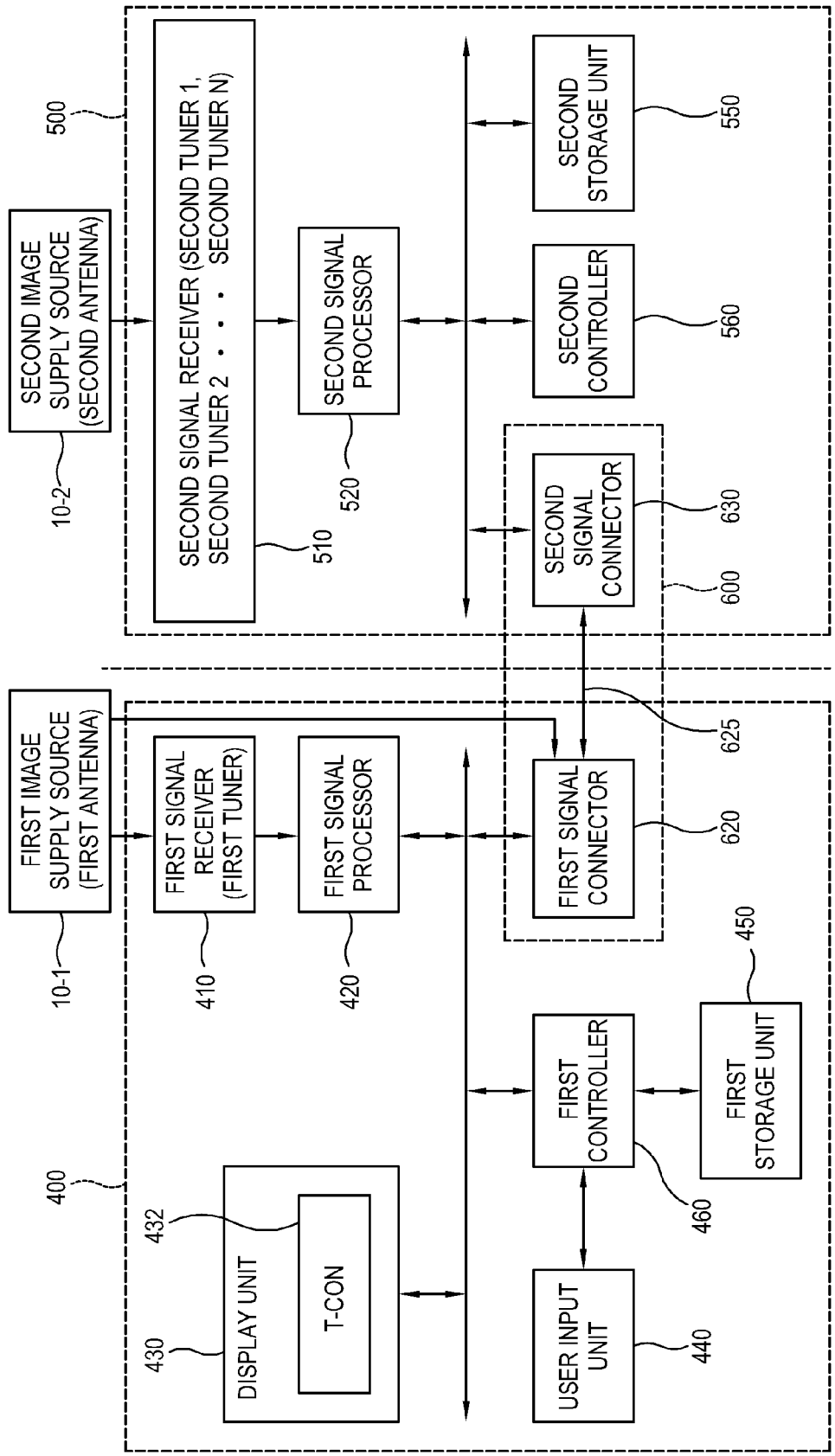
FIG. 13 is a first example of a block diagram of the device for receiving broadcasting in FIG. 12.

Hereinafter, a configuration of the display apparatus 400 and the signal processing module 500 will be described with reference to FIGS. 13 to 16. FIG. 13 is a first example of a block diagram of the display apparatus 400 and the signal processing module 500 which form the device for receiving broadcasting 1.

As shown therein, the display apparatus 400 may include a first signal receiver 410 which receives a signal from the outside through a first image supply source 10-1, a first signal processor 420 which processes an image signal transmitted by the first signal receiver 410, a display unit 430 which displays an image thereon based on the image signal processed by the first signal processor 420, a user input unit 440 which outputs a preset command according to a user's manipulation, a first storage unit 450 which stores therein various types of data/information, a first controller 460 which controls overall operations of the display apparatus 400 and a first signal connector 620 which is used to exchange signals with the external signal processing module 500.

The first image supply source 10-1 may include a first antenna to receive a broadcasting signal from a broadcasting station.

An image signal which is supplied by the first image supply source 10-1 may be transmitted to the first signal processor 420 or to the second signal connector 630 of the signal processing module 500 through the signal connector 620. The image signal supplied and transmitted as above varies corresponding to its standard or the implementation of the first image supply source 10-1 and the display apparatus 400. For example, the first signal connector 620 may receive signals/data corresponding to standards such as, for example, HDMI, USB and component, and may include a plurality of connection terminals (not shown) corresponding to such standards. In an exemplary embodiment, the respective connection terminals are connected to various external devices including the first image supply source 10-1 to perform communication with the external devices via the first signal connector 620. That is, the external device which is connected to the first signal connector 620 is not limited to being the image supply source 10-1, and any device which exchanges signals/data with the display apparatus 400 through the first signal connector 620 may be connected to the first signal connector 620. According to the present exemplary embodiment, the signal processing module 500 may be connected to the first signal connector 620.

The first signal processor 420 processes an image signal transmitted by the first signal connector 620, according to various preset signal processing operations. The first signal processor 420 outputs the processed image signal to the display unit 430 to display an image on the display unit 130 based on the image signal.

The signal processing operation of the first signal processor 420 may include, but is not limited to, a de-multiplexing operation for dividing a predetermined signal, a decoding operation corresponding to an image format of an image signal, a de-interlacing operation for converting an interlaced image signal into a progressive image signal, a scaling operation for adjusting an image signal into a preset resolution, a noise reduction operation for improving an image quality, a detail enhancement operation, a frame refresh rate conversion operation, etc.

In an exemplary embodiment, the first signal processor 420 is implemented as an image processing board (not shown) which is formed by mounting various chipsets (not shown), memories (not shown), electronic parts (not shown), wiring (not shown), etc. on a printed circuit board (PCB) (not shown) to perform the foregoing signal processing operations.

The display unit 430 displays an image thereon based on an image signal output by the first signal processor 420. The display unit 430 may be implemented as various types of display panels including, for example, liquid crystal, plasma, light-emitting diode (LED), organic light-emitting diode (OLED), surface-conduction electron-emitter, carbon nanotube, and nano-crystal, but is not limited thereto.

The display unit 430 may further include additional elements depending on its implementation type. For example, when the display unit 430 is implemented as an LCD panel, the display unit 430 may include a backlight unit (not shown) to emit light and a panel driving substrate (not shown) to drive a display panel (not shown).

In an exemplary embodiment, the display unit 430 includes a timing controller (T-con) 432 to control a timing of a signal processed and transmitted by the first signal connector 620, a line buffer (not shown), a frame memory (not shown), a gray scale conversion circuit (not shown), and a display panel (not shown). The T-con 432 may generate signals such as an enable signal, a start pulse signal, a vertical shift clock signal, a clock signal and a latch pulse signal to display on a display panel an image signal transmitted by the first signal connector 620.

The user input unit 440 may transmit to the first controller 460 various preset control commands or various types of information according to a user's manipulation and input. In an exemplary embodiment, the user input unit 440 is implemented as a menu key and an input panel installed in an external part of the display apparatus 400, or a remote controller which is separated (spaced apart from) the display apparatus 400.

In other exemplary embodiments, the user input unit 440 may be integrally formed in the display unit 430. That is, when the display unit 430 includes a touch screen, a user may transmit a preset command to the first controller 460 through an input menu (not shown) displayed on the display unit 430.

The storage unit 450 stores therein various types of data according to a control of the first controller 460. In an exemplary embodiment, the storage unit 450 is implemented as a non-volatile memory such as a flash memory or a hard disc drive. The storage unit 450 is accessed by the first controller 460, and data stored therein may be read and/or recorded and/or modified and/or deleted and/or updated by the first controller 460.

The data stored in the first storage unit 450 includes an operating system (OS), and various applications which are executed on the OS, image data, and additional data. The first storage unit 450 may store backup data of the second storage unit 550 of the signal processing module 500 when the signal processing module 500 is replaced.

Hereinafter, a configuration of the signal processing module 500 will be described with reference to FIGS. 13 to 16.

The signal processing module 500 includes a second signal connector 630 which is connected to the first signal connector 620 of the display apparatus 400, a second signal receiver 510 which receives an image signal from an external second image supply source 10-2, a second signal processor 520 which performs at least a part of the signal processing operation of the first signal processor 420, a second storage unit 550 which stores therein various types of data/information, and a second controller 560 which controls overall operations of the signal processing module 500.

The second signal connector 630 is connected to the first signal connector 620 to enable communication between the signal processing module 500 and the display apparatus 400. The second signal connector 630 is implemented in accordance with the standard corresponding to the first signal connector 620 to enable connectivity to the first signal connector 620, and may be connected to at least one of a plurality of connection terminals (not shown) of the first signal connector 620.

For example, the second signal connector 630 may be connected to an HDMI terminal to exchange image signals with the display apparatus 400, and to a USB terminal to exchange data and power with the display apparatus 400, among the plurality of connection terminals of the first signal connector 620. However, this configuration is only an example, and the connection type between the first and second signal connectors 620 and 630 may be implemented in various ways.

The second image supply source 10-2 may include a second antenna to receive a broadcasting signal from a broadcasting station.

The second signal receiver 510 may include a plurality of second tuners 1, 2, . . . and N to receive and select a channel signal through the antenna of the second image supply source 10-2.

In an exemplary embodiment, the second signal processor 520 performs a second process corresponding to at least a part of the first process of the first signal processor 420 of the display apparatus 400. The first and second processes are named for distinction purposes only, and may include a single process or a plurality of unit processes. The second process is improved in functionality compared to the first process, and the improved second process is realized by an improvement of hardware such as chipsets and/or improvement of software such as algorithms and/or execution codes and/or programs.

The second signal processor 520 performs the second process instead of the first process, according to a control of the second controller 560, when the display apparatus 400 and the signal processing module 500 are connected to each other. As the signal processing operation is performed, the second process which is improved in functionality compared to the first process may replace the first process, or the first and second processes may be simultaneously performed, resulting in improvement of efficiency in the signal processing operation. This will be described later in detail.

The second storage unit 550 stores therein various types of data. In an exemplary embodiment, the second storage unit 550 is implemented as a non-volatile memory such as a flash memory or a hard disc drive. The second storage unit 550 is accessed by the first controller 460 or the second controller 560, and data stored therein may be read and/or recorded and/or modified and/or deleted and/or updated by the first and second controllers 460 and 560. Depending on the implementation of the first storage unit 460, the first storage unit 450 may be accessed by the second controller 560 as well as the first controller 460.

The second controller 560 controls the connection operation between the display apparatus 400 and the signal processing module 500 to upgrade the entire signal processing operation. The first and second controllers 460 and 560 may be implemented as a CPU. When the second controller 560 performs an improved function with respect to a function performed by the first controller 460, the second controller 560 may disable the first controller 460 and control the entire operation of the device for receiving broadcasting 1 on behalf of the first controller 460. Otherwise, the second controller 560 may control the entire operation of the device for receiving broadcasting 1 together with the first controller 460.

A single tuner tunes a single channel and provides image/audio signals to the second signal processor 520 and provides a data signal to the second controller 560. When a user selects and views a single channel and desires to use image/audio and data signals of another channel simultaneously, an additional tuner should be provided.

As shown in FIG. 13, the device for receiving broadcasting 1 according to an exemplary embodiment may have a first tuner and a second tuner provided in the display apparatus 400 and the signal processing module 500, respectively, for a user to view multi channels by using multi tuners.

Hereinafter, a tuning operation of the multi tuners according to an exemplary embodiment will be described.

When the signal processing module 500 is provided, upgraded control software which is provided in the signal processing module 500 or provided additionally may be reinstalled in the display apparatus 400 or installed therein as a supplement. This process newly establishes efficient communication operation regulations between the first and second controllers 460 and 560 to effectively implement the added multi-tuner function.

When the signal processing module 500 is provided, the first and second controllers 460 and 560 may communicate with each other in both wired and wireless manners, and videos/audio and data signals generated by the signal processing module 500 may be provided to the display apparatus 400 in a wired and/or wireless manner.

The first and second controllers 460 and 560 may have different roles, and the first controller 460 of the display apparatus 400 may serve as a main controller or the second controller 560 of the signal processing module 500 may serve as a main controller. Whichever is the main controller, an implementation order of an additional tuner function as an additional operation of main operations of the display apparatus 400 is as follows.

For example, when a user desires to display a screen of another channel while a main screen displays a particular channel, a second tuner of the signal processing module 500 selects the desired channel and videos/audio and data signals are transmitted by the second tuner to the display apparatus 400 according to a communication between the first and second controllers 460 and 560. Then, the display apparatus 400 displays a sub-screen based on the foregoing signals.

Figure 14:
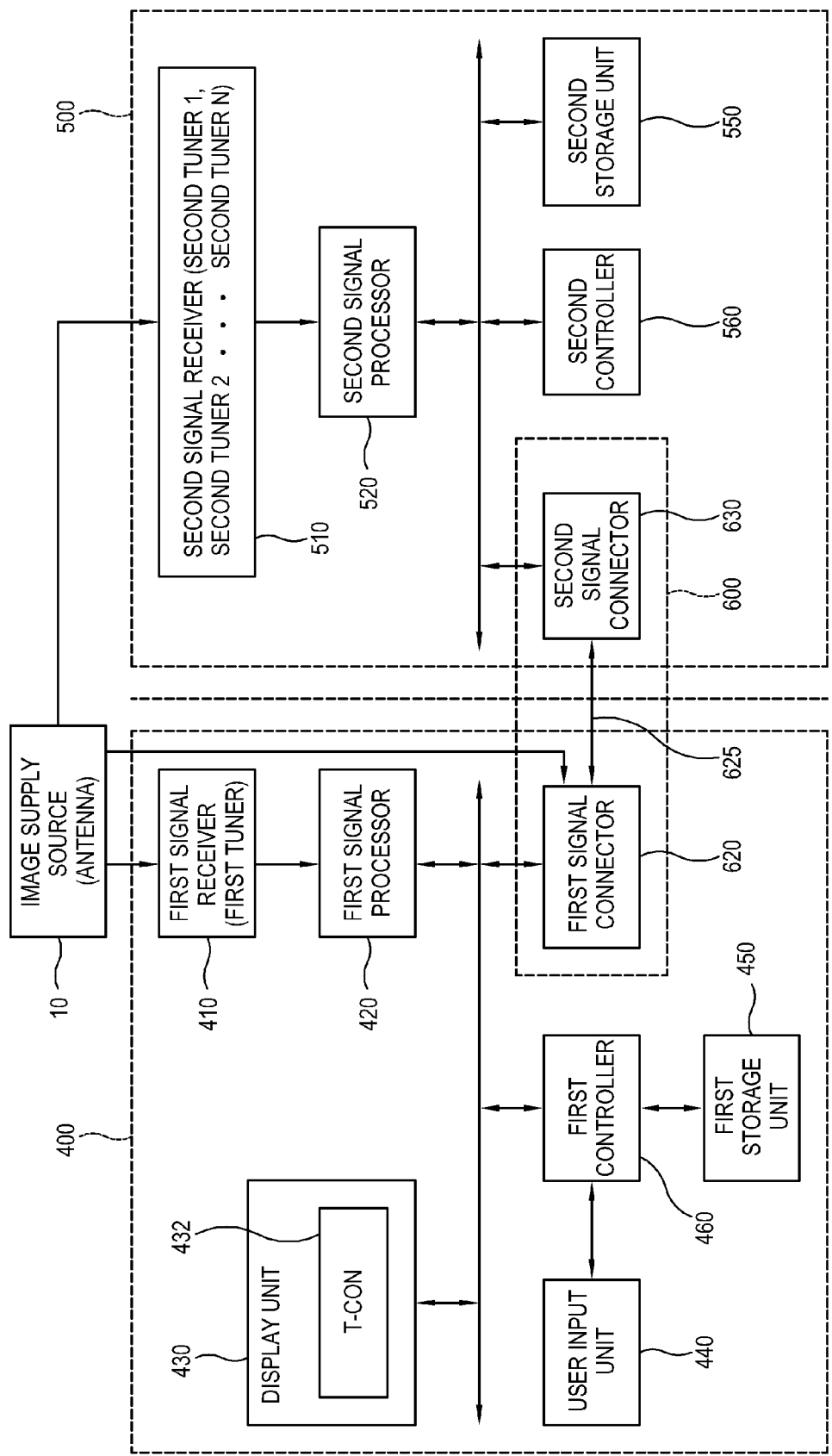
FIG. 14 is a second example of a block diagram of the device for receiving broadcasting in FIG. 12.

Antennas may be additionally connected to the display apparatus 400 and the signal processing module 500 as shown in FIG. 13, or alternatively, a single antenna provided in either the display apparatus 400 or the signal processing module 500 may be shared therebetween as shown in FIG. 14.

Figure 15:
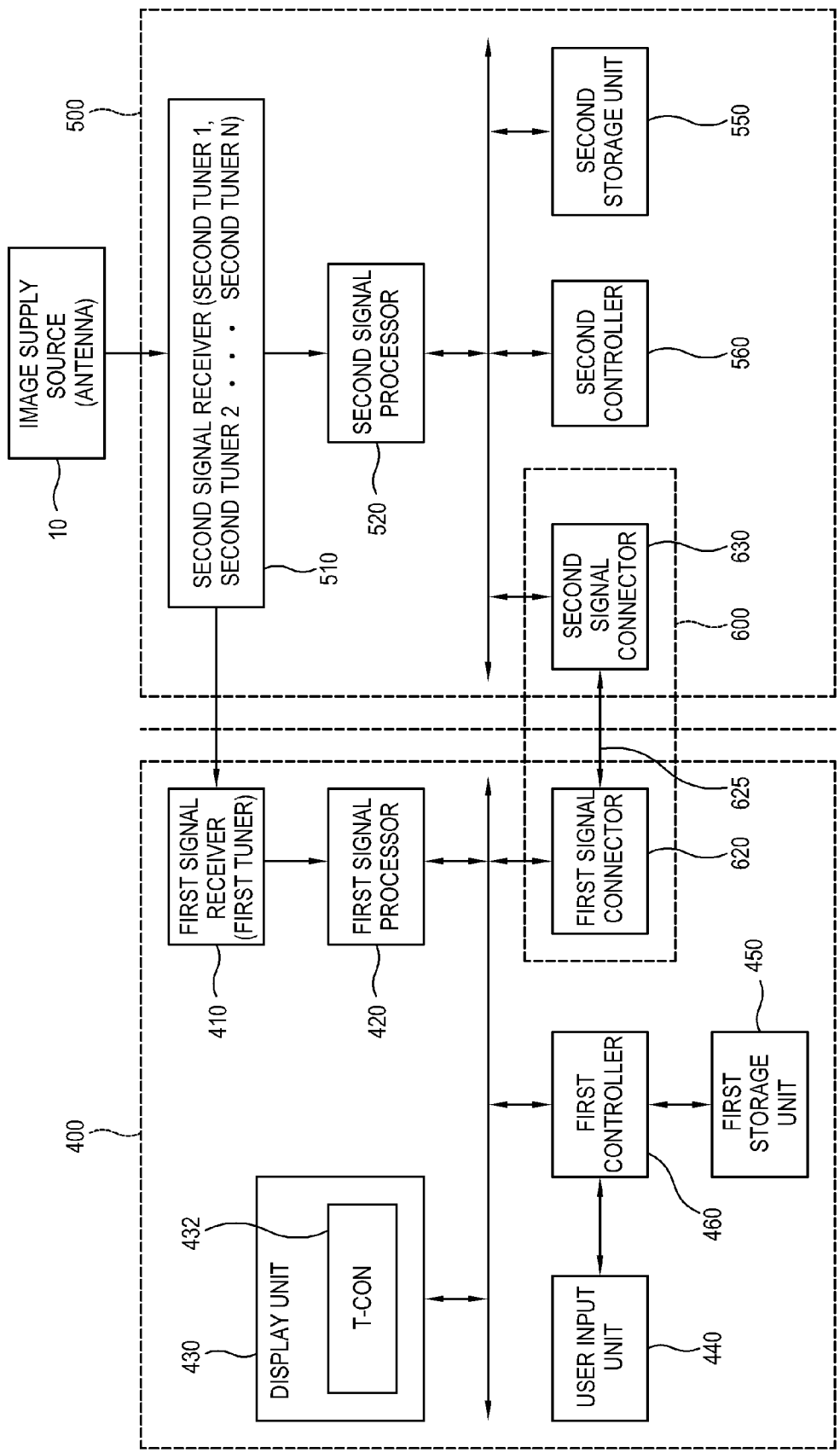
FIG. 15 is a third example of a block diagram of the device for receiving broadcasting in FIG. 12.

As shown in FIG. 15, a stream which is received by the antenna connected to the signal processing module 500 may be branched to the display apparatus 400 by the signal processing module 500 and transmitted in a wired and/or wireless manner. In this case, the existing antenna cable is maintained and an additional second tuner may receive an antenna signal.

Figure 16:
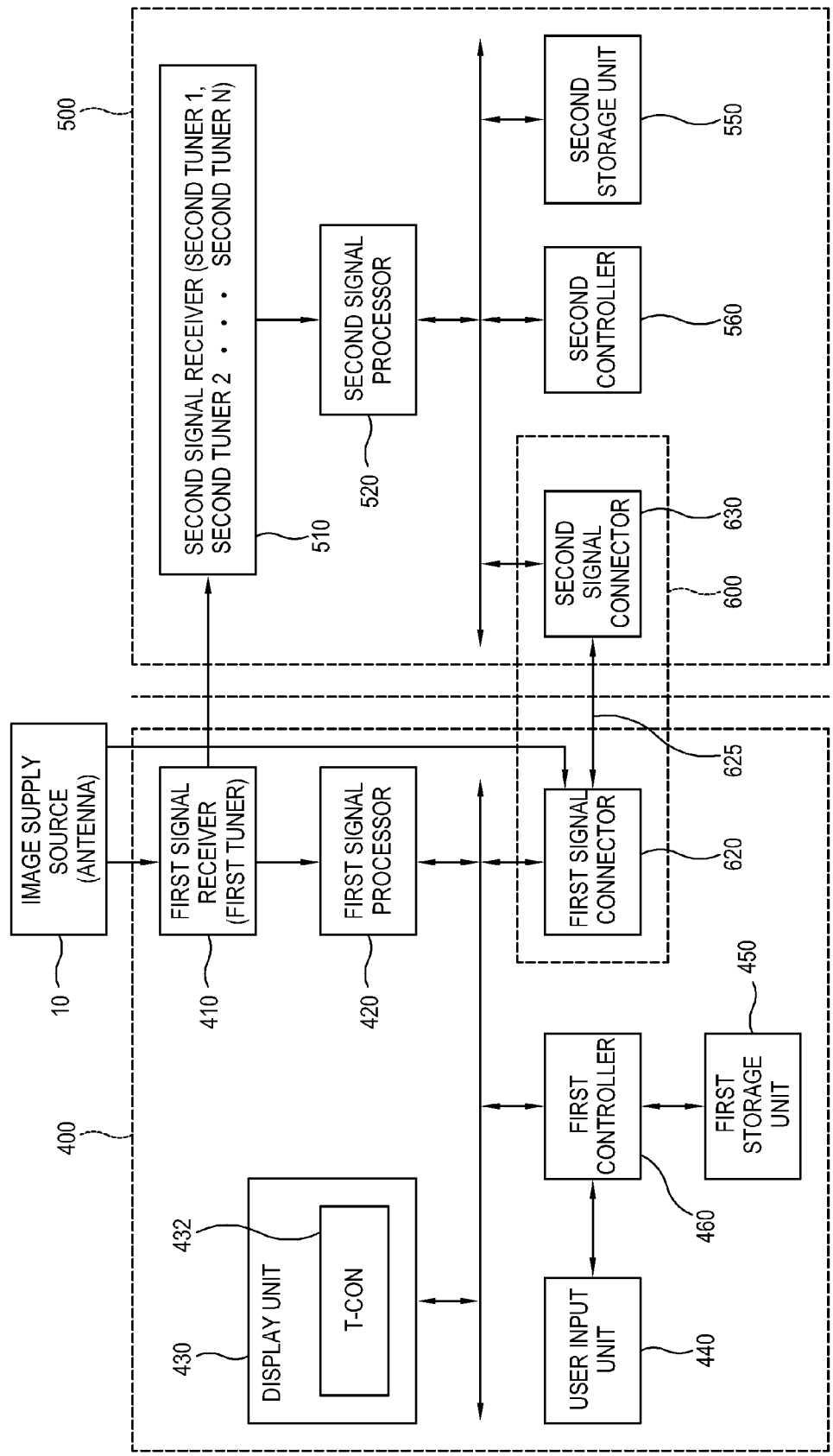
FIG. 16 is a fourth example of a block diagram of the device for receiving broadcasting in FIG. 12.

Likewise, as shown in FIG. 16, a stream which is received by the antenna connected to the display apparatus 400 may be branched to the signal processing module 500 by the display apparatus 400 and transmitted in a wired and/or wireless manner. In this case, the existing antenna cable is maintained and an additional first tuner may receive an antenna signal.

Figure 17:
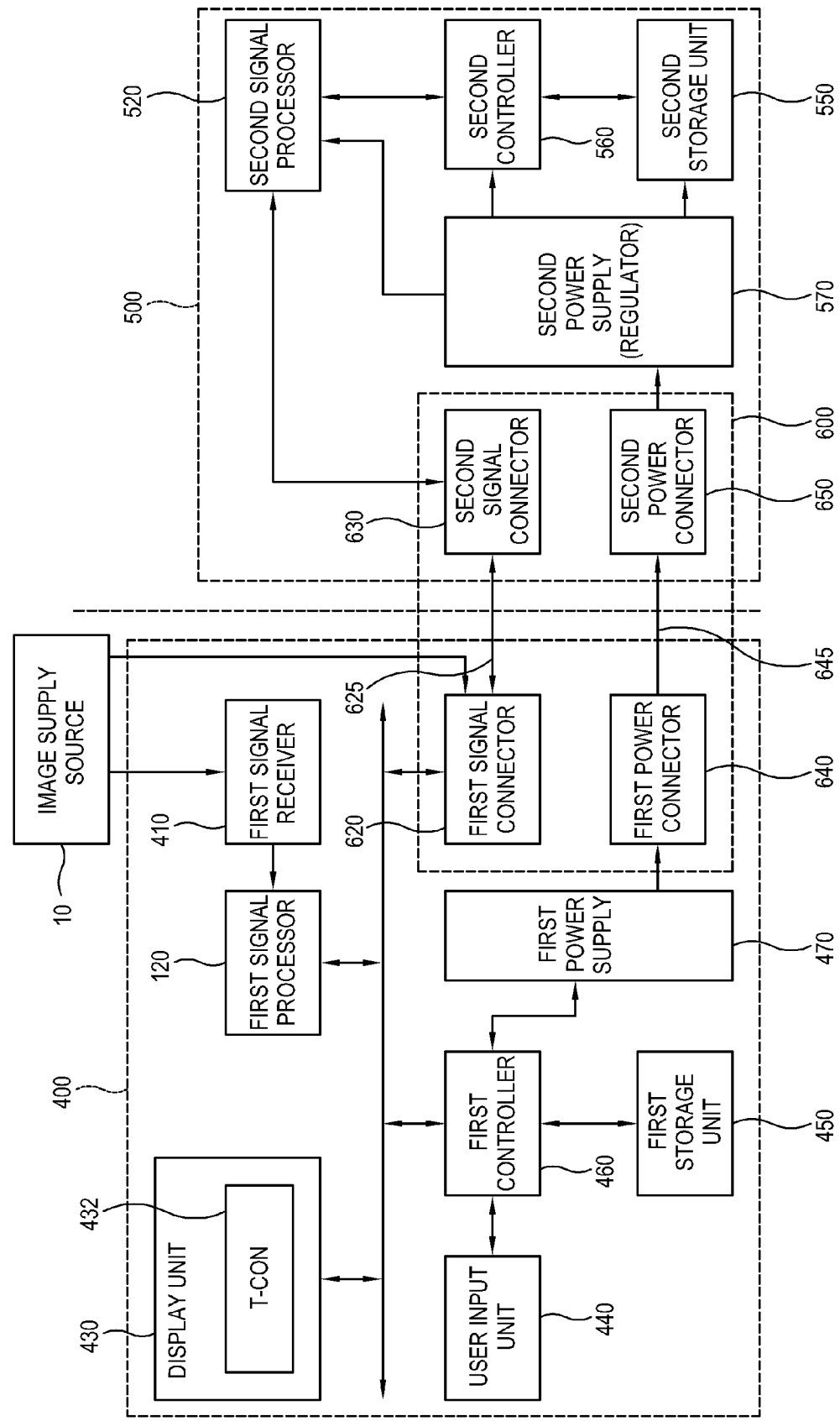
FIG. 17 is a fifth example of a block diagram of the device for receiving broadcasting in FIG. 12 according to another exemplary embodiment.
Figure 18:
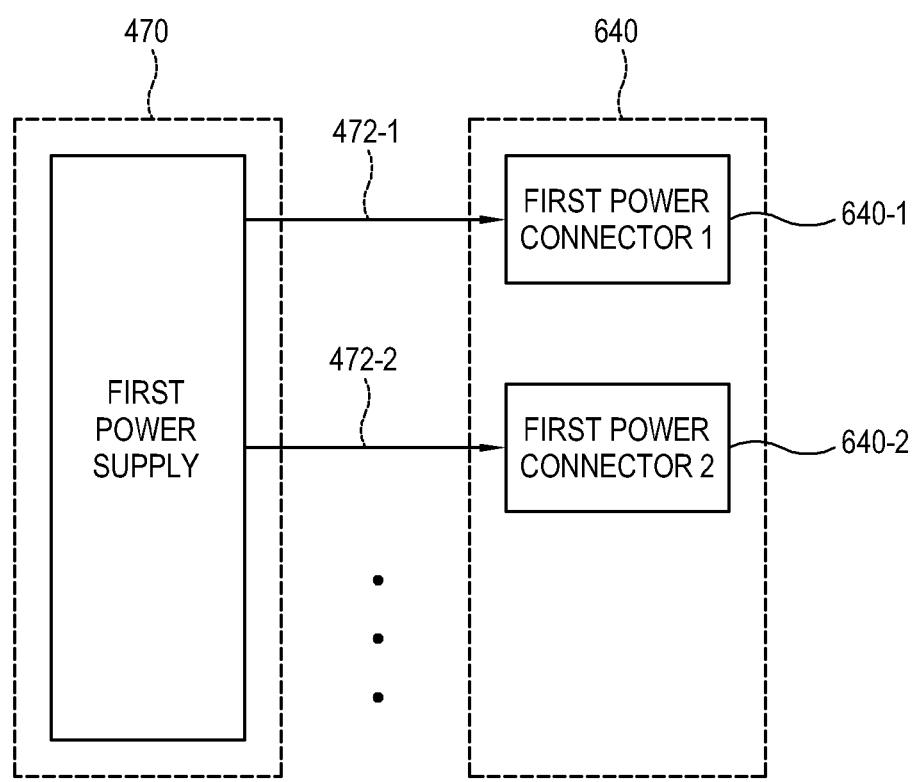
FIG. 18 is a block diagram of a power supply of a display apparatus according to an exemplary embodiment.

FIG. 17 is a fifth example of a block diagram of the device for receiving broadcasting 1, together with a first power supply 470 of the display apparatus 400 and a second power supply 570 of the signal processing module 500, which are not shown in FIG. 13. The first power supply 470 of the display apparatus 400 supplies power to the second power supply 570 through the first and second power connectors 640 and 650.

The first power supply 470 supplies power which is used by the display apparatus 400. For example, the first power supply 470 generates a CPU core voltage to drive the first controller 460, a memory voltage to drive the first storage unit 450, an input/output voltage to drive the user input unit 440, a voltage to drive the display unit 430 and a speaker (not shown) and a voltage to drive other peripheral devices. In an exemplary embodiment, the first power supply 470 may include an SMPS or a DC-DC converter.

The power supply 470 according to an exemplary embodiment includes at least one first power connector 640 which outputs a DC voltage to supply power to the signal processing module 500.

The second power supply 570 receives power from the first power supply 470 of the display apparatus 400 and supplies power necessary for the signal processing module 500. The second power supply 570 may include a regulator.

In FIG. 17, the first signal connector 620 and the first power connector 640 may be provided as a single upgrade port to enable a user to easily connect the first signal connector 620 and the first power connector 640. In an exemplary embodiment, the upgrade port includes a USB port. In addition, the first signal connector 620 and the first power connector 640 may be provided separately. In this case, a power source of the signal processing module 500 may be connected to a USB port or the first power connector 640 which is additionally formed, and the first signal connector 620 may use, e.g., an HDMI port.

The first power supply 470 may include a plurality of output ports 472-1, 472-2, . . . which has different outputs to be prepared for the case where power consumption of the signal processing module 500 varies. The plurality of output ports 472-1, 472-2, . . . may be connected to the plurality of first power connectors 640-1, 640-2, . . . to connect the first power supply 470 to the signal processing module 500. For example, the output port 1 (472-1) may output 0.5 V and the output port 2 (472-2) may output DC 1.0 V.

In an exemplary embodiment, the signal processing module 500 does not include the display unit 430 or the speaker to output video and audio, and thus may be driven by the power through the USB port. However, in other exemplary embodiments, when the signal processing module 500 includes a particular peripheral device or the display unit 430 and the speaker, which should be driven, a single power connector having a single output value may not be enough for driving each of these components. Thus, according to other exemplary embodiments, a design for supplying power with various values is provided.

For example, if the output port 1 (472-1) of the first power supply 470 is connected to the first signal processing module 500 through the first power connector 1 (640-1) and the power consumption of the signal processing module 500 exceeds the maximum output value of the output port 1 (472-1), parts of the display apparatus 400 may be damaged or performance thereof may be deteriorated. In this case, the first power supply 470 should disconnect the output port 1 (472-1).

Figure 19:
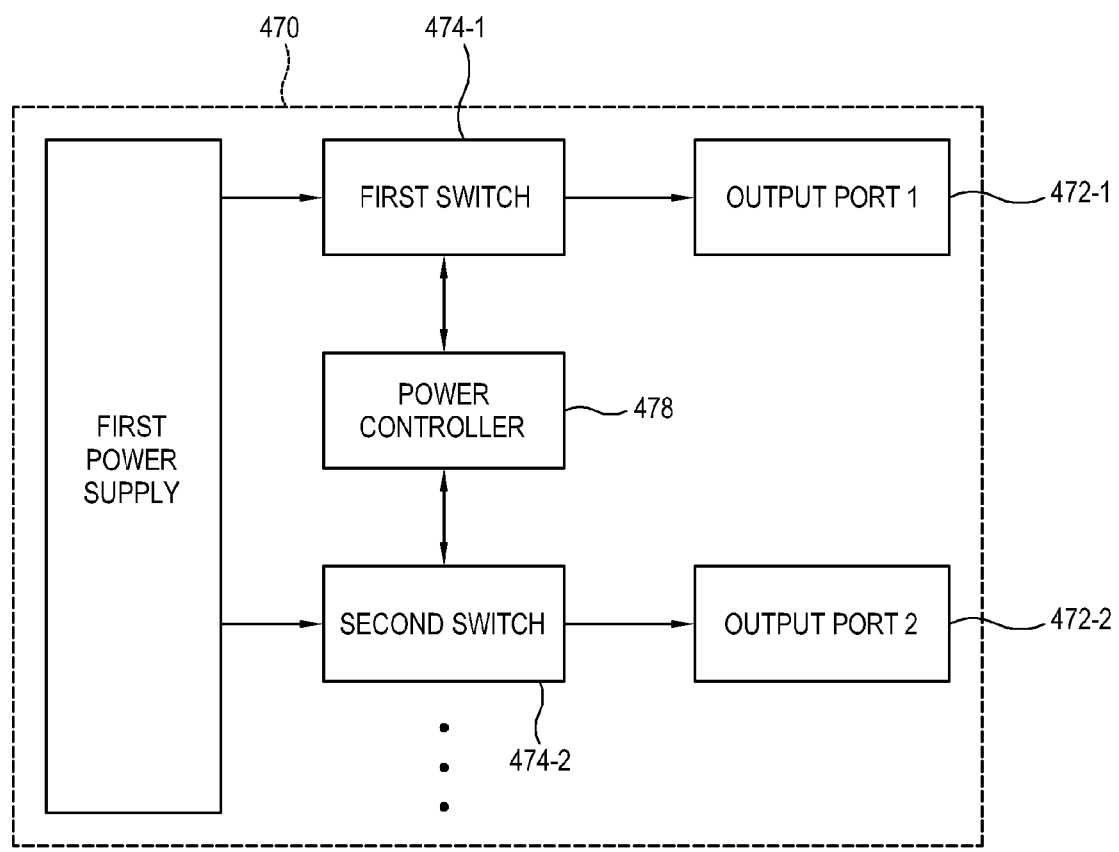
FIG. 19 is a block diagram of the power supply in FIG. 18.

FIG. 19 illustrates the first power supply 470 which may select the output ports 472-1, 472-2, . . . which provide different power levels. The first power supply 470 includes switches 474-1, 474-2 . . . 174-n to turn on or off the plurality of output ports 472-1, 472-2 . . . 472-n according to the power consumption of the signal processing module 500. The plurality of switches 474-1, 474-2 . . . 474-n may be switched by the first controller 460 of the display apparatus 400 or through an additional power controller 478.

Figure 20:
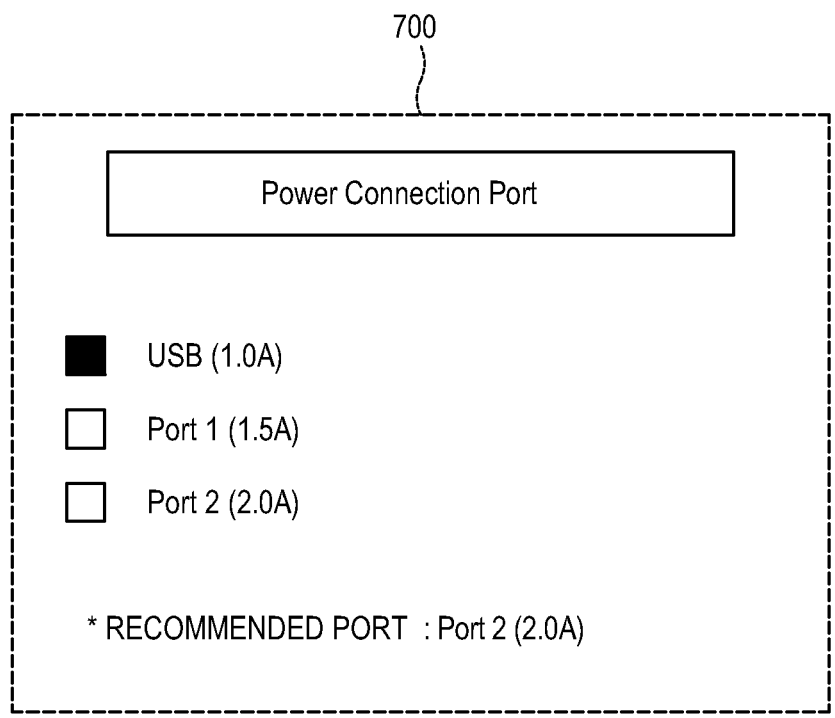
FIG. 20 illustrates a user interface (UI) for supplying a proper voltage to a signal processing module according to an exemplary embodiment.

As shown in FIG. 20, the first controller 460 or the power controller 478 may generate and display a UI 700 to select one of the plurality of output ports 472-1, 472-2 . . . 472-n based on the power consumption of the connected signal processing module 500.

The UI 700 may display a connected output port (e.g., USB) of the plurality of output ports USB, port1, and port2 when a user connects the signal processing module 500, and may display a recommended output port (Port 2) in consideration of the power consumption of the signal processing module 500.

Hereinafter, a method for receiving broadcasting to be implemented by the device for receiving broadcasting 1 according to the exemplary embodiments shown in FIGS. 1 to 4 will be described in detail.

Hereinafter, an exemplary embodiment for upgrading the display apparatus 100 by the signal processing module 200 will be explained.

Figure 21:
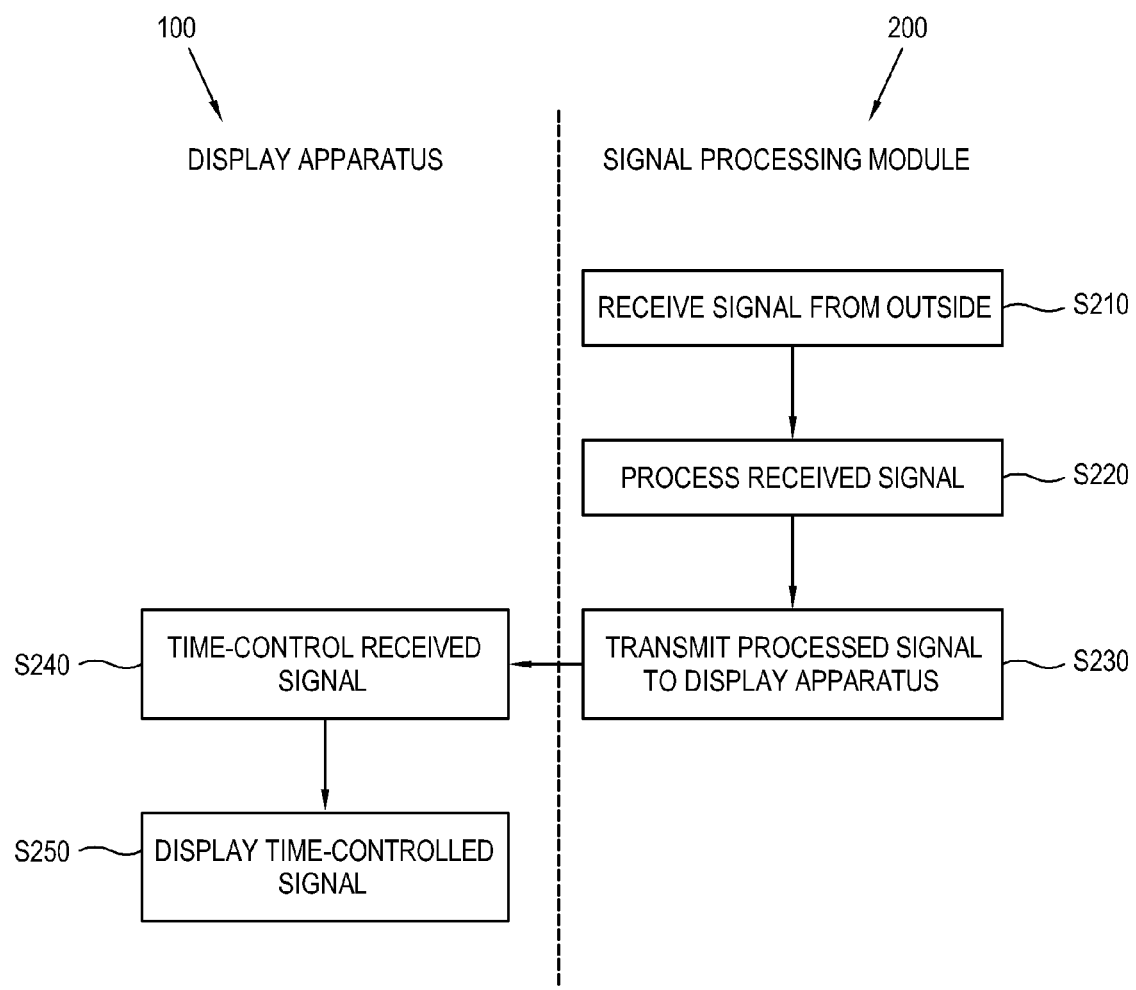
FIG. 21 is a flowchart showing a method for processing a signal by a device for receiving broadcasting according to an exemplary embodiment.

FIG. 21 is a flowchart showing a signal processing method of the signal processing module 200 for receiving broadcasting in the display apparatus 1 according to the present exemplary embodiment. As shown therein, when a predetermined signal, e.g. a broadcasting signal, is supplied by the image supply source 10 at operation S210, the signal processor 220 processes the broadcasting signal according to a preset signal processing operation at operation S220. The processed signal is transmitted to the external display apparatus 100 at operation S230. The timing controller 132 of the display apparatus 100 controls timing to display the signal transmitted by the signal processing module 200, on the display panel at operation S240). The display unit 130 displays the timing-controlled signal on the display panel at operation S250. As described above, the display apparatus 100 may receive and display the signal processed by the signal processing module 200 instead of receiving the signal from the external image supply source and processing the signal. Furthermore, according to other exemplary embodiments, even if the display apparatus 100 receives the image signal from an external image supply source, the display apparatus 100 may transmit the image signal to the signal processing module 200 so that the signal is processed by the signal processing module 200.

Hereinafter, a method for receiving broadcasting to be implemented by the device for receiving broadcasting 1 according to the exemplary embodiments shown in FIGS. 12 to 17 will be described in detail with reference to FIGS. 22 and 23.

Figure 22:
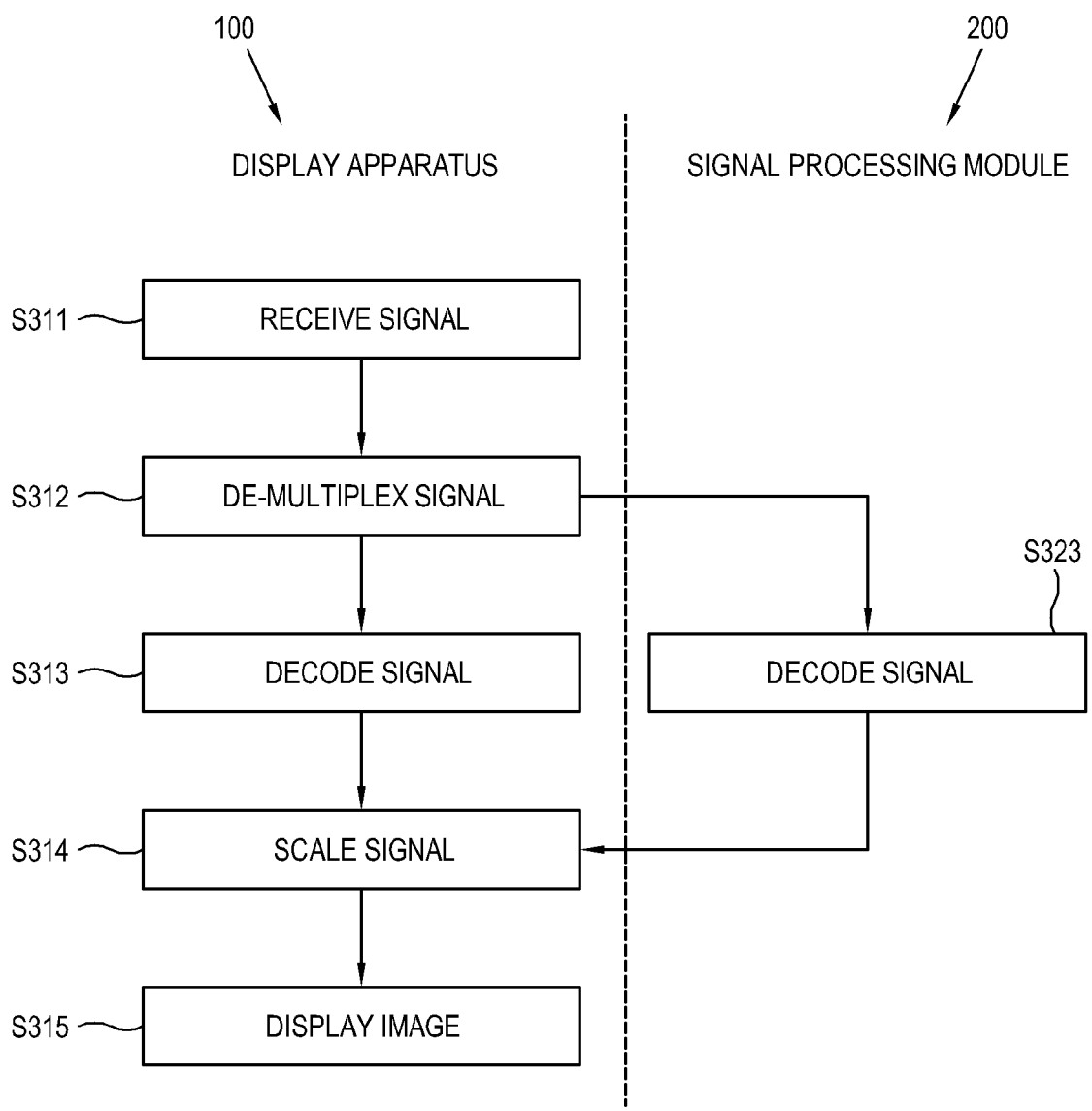
FIG. 22 is a flowchart showing a method for processing a signal by a device for receiving broadcasting according to another exemplary embodiment.
Figure 23:
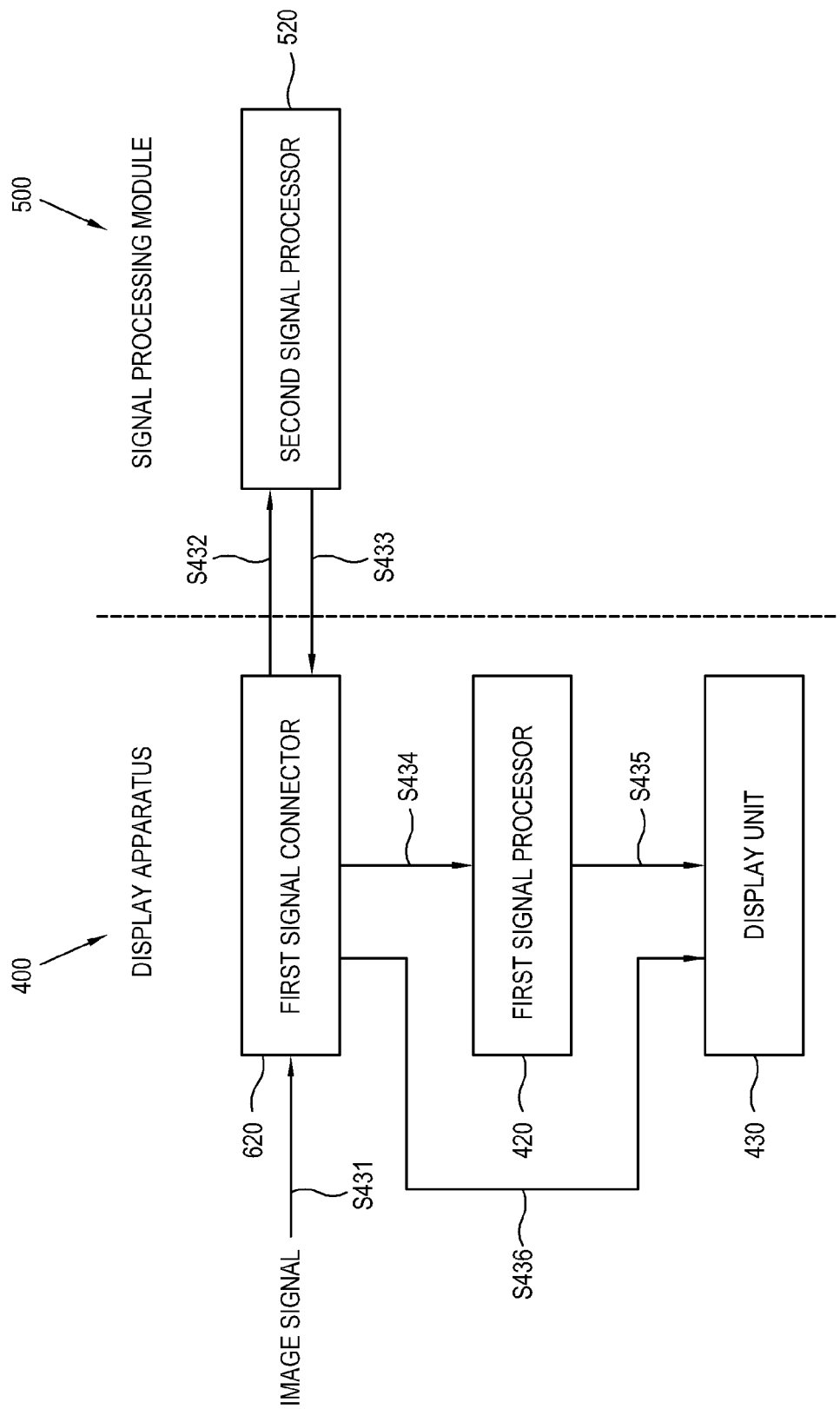
FIG. 23 is a flowchart showing a method for processing a signal by a device for receiving broadcasting according to another exemplary embodiment.

FIG. 22 is a flowchart showing a method of upgrading the signal processing operation of the display apparatus 400 by the signal processing module 500 in the device for receiving broadcasting 1 according to the present exemplary embodiment.

As shown therein, when a predetermined signal, e.g., a broadcasting signal, is supplied by the image supply source 10 at operation S311), the display apparatus 400 processes the broadcasting signal according to signal processing operations S312, S313 and S314 in a preset sequence. The signal processing operations S312, S313 and S314 in FIG. 22 represent a few examples to simplify the exemplary embodiment, and do not represent all of the signal processing operations which may be performed by the display apparatus 400.

The display apparatus 400 de-multiplexes the received broadcasting signal to divide the signal into an image signal, an audio signal and additional data at operation S312. The display apparatus 400 processes the de-multiplexed signals, e.g., decodes the image signal into a preset image format at operation S313. The display apparatus 400 scales the decoded image signal into a preset resolution at operation S314 and displays an image based on the scaled image signal at operation S315.

In the foregoing sequence, the signal processing module 500 performs an operation S323 corresponding to the decoding operation S313 of the display apparatus 400. The decoding operation S323 of the signal processing module 500 is substantially the same in the operation itself as the decoding operation S313 of the display apparatus 400, but is improved in functionality compared to the decoding operation S313 of the display apparatus 400. Thus, performance of the decoding operation S323 rather than the decoding operation S313 may improve the image processing operation.

For example, the decoding operation S323 may process an image signal with a resolution level that is higher than the resolution level processed by the decoding operation S313, process an image signal in a format that is not capable of being processed by the decoding operation S313 or apply additional effects to the image signal that cannot be applied by the decoding operation S313.

In the sequence of the image processing operation according to the present exemplary embodiment, the decoding operation S323 of the signal processing module 500 replaces the decoding operation S313 of the display apparatus 400 following the de-multiplexing operation S312. Following the decoding operation S323 of the signal processing module 500, the scaling operation S314 is performed.

In the foregoing sequence, the display apparatus 400 and the signal processing module 500 exchange image signals and control signals, according to a control of the first controller 460 or the second controller 560.

Unlike the case in FIG. 22 in which a part of the signal processing operation is replaced, the second signal processor 520 of the signal processing module 500 may replace the first signal processor 420 of the display apparatus 400. This will be described with reference to FIG. 23. FIG. 23 is a block diagram showing a transmission process of an image signal transmitted to the first signal connector 620 by the device for receiving broadcasting 1 according to another exemplary embodiment.

As shown therein, when the signal processing module 500 is not connected to the display apparatus 400, an image signal is received by the first signal connector 620 at operation S431 and then transmitted to the first signal processor 420 at operation S434.

The first signal processor 420 processes and outputs the image signal to the display unit 430 at operation S435, and the display unit 430 displays an image based on the image signal processed by the first signal processor 420.

Alternatively, when the signal processing module 500 is connected to the display apparatus 400, the image signal is received by the first signal connector 620 at operation S431), and then transmitted to the second signal processor 520 rather than to the first signal processor 420 at operation S432. The second signal processor 520 processes the image signal on behalf of the first signal processor 420, and the image signal processed by the second signal processor 520 is transmitted back to the display apparatus 400 at operation S433.

The image signal bypasses the first signal processor 420 and is transmitted to the display unit 430 at operation 5436, on which an image is displayed based on the image signal processed by the second signal processor 520.

When the display apparatus 400 and the signal processing module 500 are connected to each other, the second controller 560 may disable the first controller 460 and control the first and second signal processor 420 and 520. Alternatively, when an OS stored in the second storage unit 550 is an upgraded version of the OS stored in the first storage unit 450, the OS of the first storage unit 450 may be upgraded to the OS of the second storage unit 550, and then the upgraded OS may be driven, or the OS of the second storage unit 550 rather than the OS of the first storage unit 450 may be driven.

With the foregoing configuration, the signal processing module 500 according to the present exemplary embodiment may upgrade the display apparatus 400.

As described above, a device for receiving broadcasting according to exemplary embodiments may be repaired or upgraded without difficulty as the display apparatus and the signal processing module are easily connected to and disconnected from each other in a simple fashion by a single connector.

The device for receiving broadcasting according to exemplary embodiments may be repaired or upgraded by a user himself/herself.

The device for receiving broadcasting according to exemplary embodiments may be designed in a slim shape as the signal processing module is separated from the display apparatus.

The device for receiving broadcasting according to exemplary embodiments may be easily transported and moved as the display apparatus and the signal processing module are separated.

The device for receiving broadcasting according to exemplary embodiments includes the display apparatus and the signal processing module which are separated from each other, and employs a transmission configuration by which signals and power are transmitted through a single cable so that a power cable and a signal receiver may be removed from either the display apparatus or the signal processing module.

The device for receiving broadcasting according to exemplary embodiments includes the display apparatus and the signal processing module which are separated from each other, with the single processing module being configured to process a plurality of contents and transmit the contents to the display apparatus through a single connector to output a multi-view display.

The device for receiving broadcasting according to exemplary embodiments includes the display apparatus and the signal processing module, which are separated from each other and which each include a tuner, and performs functions as a multi-tuner.

Although a few exemplary embodiments have been shown and described, it will be appreciated by those skilled in the art that changes may be made in these exemplary embodiments without departing from the principles and spirit of the exemplary embodiments, the range of which is defined in the appended claims and their equivalents.

What is claimed is:

1. A device for receiving broadcasting comprising:
a display apparatus which comprises:
a display unit configured to display an image,
a cover which partially covers the display unit,
a first signal connector configured to transmit a signal to and receive a signal from the outside of the cover, and
a timing controller (T-con) configured to control a display timing of a signal transmitted by the first signal connector; and
a signal processing module which is portable, the signal processing module comprising:
a second signal connector configured to exchange a signal with the display apparatus,
a signal processor configured to process a signal input from the outside, and
a controller configured to control the signal processor,
wherein the first and second signal connectors each comprise a single cable and are configured to connect to either the display apparatus or the signal processing module,
wherein the cable comprises at least one second power connector which is configured to supply power to the signal processing module by the display apparatus,
wherein the signal processed by the signal processing module is transmitted directly to the timing controller,
wherein the second signal connector comprises an encoder which encodes a plurality of content data processed by the signal processor,
wherein the first signal connector comprises a decoder which decodes the encoded data signal of the plurality of contents transmitted by the signal processing module.

2. The device according to claim 1, wherein the first and second signal connectors comprise at least one of a universal serial bus (USB) terminal, a high definition multimedia interface (HDMI) terminal, a LAN terminal, a SCART terminal, an RS232 terminal, an optical terminal, and a radio frequency (RF) transmitter.

3. The device according to claim 1, wherein the first and second signal connectors and the first power connector each comprise a USB terminal.

4. The device according to claim 1, wherein the signal processing module compresses a data signal of a plurality of contents processed by the signal processor and transmits the compressed data signal to the display apparatus through a pair of first and second signal connectors.

5. The device according to claim 1, wherein the signal processing module transmits a data signal of a plurality of contents processed by the signal processor to the display apparatus through a pair of first and second signal connectors, and the display unit of the display apparatus outputs the data signal of the plurality of contents, in a multi-view format.

6. The device according to claim 1, wherein the signal processing module comprises a multiplexer which multiplexes a data signal of a plurality of contents, and transmits the multiplexed data signal of the plurality of contents to the display apparatus through a pair of first and second signal connectors, and the display unit of the display apparatus outputs the multiplexed data signal of the plurality of contents, in a multi-view format.

7. The device according to claim 1, wherein the display apparatus further comprises a storage unit.

8. The device according to claim 7, wherein the storage unit stores backup data of the signal processing module.

9. The device according to claim 1, wherein the display apparatus further comprises a first power supply configured to supply power to the at least one second power connector.

10. The device according to claim 9, wherein the first power supply supplies different voltages to a plurality of the second power connectors.

11. The device according to claim 10, wherein the display apparatus further comprises a power controller which controls the first power supply to change a second power connector connected to the signal processing module to another second power connector to meet power consumption requirements of the signal processing module when power consumption of the signal processing module exceeds a maximum output value of the connected second power connector.

12. The device according to claim 11, wherein the power controller compares the power consumption of the signal processing module and a power output of the second power connector when the signal processing module is connected to the display apparatus, and displays a user interface (UI) for selecting another second power connector meeting the power consumption requirements of the signal processing module out of the plurality of second power connectors.

13. The device according to claim 1, wherein the signal processing module comprises a second power supply to supply power to each element.

14. The device according to claim 13, wherein the second power supply comprises a regulator.

15. A method for receiving and displaying broadcasting, the method comprising:
processing a signal by a signal processing module which is portable and provided outside a cover of a display apparatus;
transmitting the signal processed by the signal processing module to a display apparatus provided outside of a case of the signal processing module, through at least one signal connector;
encoding the processed signal by an encoder,
decoding the encoded signal by a decoder,
controlling a display timing of the decoded signal, by a timing controller of the display apparatus; and
displaying the timing-controlled signal on a display unit of the display apparatus,
wherein the first and second signal connectors each comprise a single cable and are configured to connect to either the display apparatus or the signal processing module,
wherein the cable comprises at least one second power connector which is configured to supply power to the signal processing module by the display apparatus,
wherein the signal processed by the signal processing module is transmitted directly to the timing controller,
wherein the second signal connector comprises the encoder,
wherein the first signal connector comprises a decoder.

16. The method according to claim 15, further comprising:
processing a data signal of a plurality of contents by a signal processor of the signal processing module;
compressing the processed data signal of the plurality of contents; and
transmitting the compressed data signal to the display apparatus through a single signal connector.

17. The method according to claim 15, further comprising:
processing a data signal of a plurality of contents by a signal processor of the signal processing module;
transmitting the processed data signal of the plurality of contents to the display apparatus through a plurality of signal connectors; and
outputting the received data signal of the plurality of contents in a multi-view format to the display unit.

18. The method according to claim 15, further comprising:
multiplexing a data signal of a plurality of contents by a multiplexer of the signal processing module;
transmitting the multiplexed data signal of the plurality of contents to the display apparatus through a single signal connector; and
outputting the multiplexed data signal of the plurality of contents in a multi-view format to the display unit.

19. The method according to claim 15, further comprising storing backup data of the signal processing module, in a storage unit of the display apparatus.

20. The method according to claim 15, further comprising supplying power to the second power connector by a first power supply of the display apparatus.

21. The method according to claim 20, wherein the first power supply supplies different voltages to a plurality of the second power connectors.

22. The method according to claim 21, further comprising controlling the first power supply to change a second power connector connected to the signal processing module to another second power connector to meet power consumption requirements of the signal processing module when power consumption of the signal processing module exceeds a maximum output value of the connected second power connector.

23. The method according to claim 22, further comprising comparing a power consumption of the signal processing module and a power output of the second power connector when the signal processing module is connected to the display apparatus; and
displaying a UI for selecting the second power connector meeting the power consumption of the signal processing module out of the plurality of second power connectors, based on a result of the comparing.

24. The method according to claim 15, further comprising supplying power, which is input through the second power connector, to each element of the signal processing module by a second power supply of the signal processing module.

* * * * *